US006456030B1

United States Patent
Masaki et al.

(10) Patent No.: US 6,456,030 B1
(45) Date of Patent: *Sep. 24, 2002

(54) SYNCHRONOUS MOTOR CONTROL DEVICE, ELECTRIC MOTOR VEHICLE CONTROL DEVICE AND METHOD OF CONTROLLING SYNCHRONOUS MOTOR

(75) Inventors: Ryoso Masaki, Hitachi; Satoru Kaneko, Urizura-machi, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/865,537

(22) Filed: May 29, 2001

Related U.S. Application Data

(63) Continuation of application No. 09/409,992, filed on Sep. 30, 1999, now Pat. No. 6,281,656.

(30) Foreign Application Priority Data

Sep. 30, 1998 (JP) .......................................... 10-276946

(51) Int. Cl.$^7$ ................................................ H02P 7/36
(52) U.S. Cl. ...................... 318/700; 318/701; 318/702; 318/804; 318/805; 318/807
(58) Field of Search .................. 318/700, 49, 701, 318/34, 804, 661, 805, 811, 807, 723, 41, 254, 439, 801, 724, 299, 715, 721; 361/33

(56) References Cited

U.S. PATENT DOCUMENTS 4,547,719 A * 10/1985 Sakamoto et al. .......... 318/723

(List continued on next page.)

FOREIGN PATENT DOCUMENTS

| JP | 7-245981 | of 1995 |
| JP | 8-205578 | of 1996 |
| JP | 10-229699 | of 1998 |

OTHER PUBLICATIONS

"Control of Salient Type Brushless DC Motor with Sensorless Based on Estimation of Speed Electromotive Force" Takeshita et al, (Collected papers of Japanese Electrical Engineers Society, vol. 117–D, No. 1, 1997).

Primary Examiner—Khanh Dang
(74) Attorney, Agent, or Firm—Crowell & Moring LLP

(57) ABSTRACT

A synchronous motor control system includes a synchronous motor 1, an inverter 3 and a controller 4 wherein a current differential detecting unit 13 detects a variation of a motor current when the three phases of the motor 1 is short circuited by the inverter 3, namely at the moment when a carrier wave in a PWM signal generator 9 assumes maximum or minimum value, in a calculating unit 14 a phase γ from α axis of a stationary coordinate system to a three phase short circuited current differential vector is calculated, a phase δ is estimated from d axis to the three phase short circuited current differential vector by making use of d axis current id and q axis current iq on d-q axes coordinate system in the controller 4, thereafter the magnetic pole position θ with respect to α axis is calculated from the phases γ and δ, based on thus calculated magnetic pole position θ, d-q axes control units 11, 7 and 8 are constituted to control the synchronous motor, thereby a highly reliable control system for the motor which permits a detection of the magnetic pole position without affecting a state of applied voltage thereto while performing a usual PWM control with a low cost controller.

49 Claims, 22 Drawing Sheets

U.S. PATENT DOCUMENTS

| | | | | |
|---|---|---|---|---|
| 4,814,677 A | * | 3/1989 | Plunkett | 318/254 |
| 4,885,518 A | * | 12/1989 | Schauder | 318/798 |
| 5,334,923 A | * | 8/1994 | Lorenz et al. | 318/805 |
| 5,365,153 A | * | 11/1994 | Fujita et al. | 318/34 |
| 5,376,869 A | * | 12/1994 | Konrad | 318/587 |
| 5,568,023 A | * | 10/1996 | Grayer et al. | 318/139 |
| 5,569,994 A | * | 10/1996 | Taylor et al. | 318/700 |
| 5,666,015 A | * | 9/1997 | Uchibori et al. | 310/261 |
| 5,694,010 A | * | 12/1997 | Oomura et al. | 318/254 |
| 5,877,606 A | * | 3/1999 | Nozari | 318/700 |
| 5,914,582 A | * | 6/1999 | Takamoto et al. | 318/801 |
| 5,916,062 A | * | 6/1999 | Siepker | 477/194 |
| 5,920,162 A | * | 7/1999 | Hanson et al. | 318/254 |
| 5,955,860 A | * | 9/1999 | Taga et al. | 318/700 |
| 5,969,496 A | * | 10/1999 | Yamada et al. | 318/715 |
| 6,005,365 A | * | 12/1999 | Kaneko et al. | 318/700 |
| 6,014,007 A | * | 1/2000 | Seibel et al. | 318/805 |
| 6,153,993 A | * | 11/2000 | Oomura et al. | 318/434 |

* cited by examiner

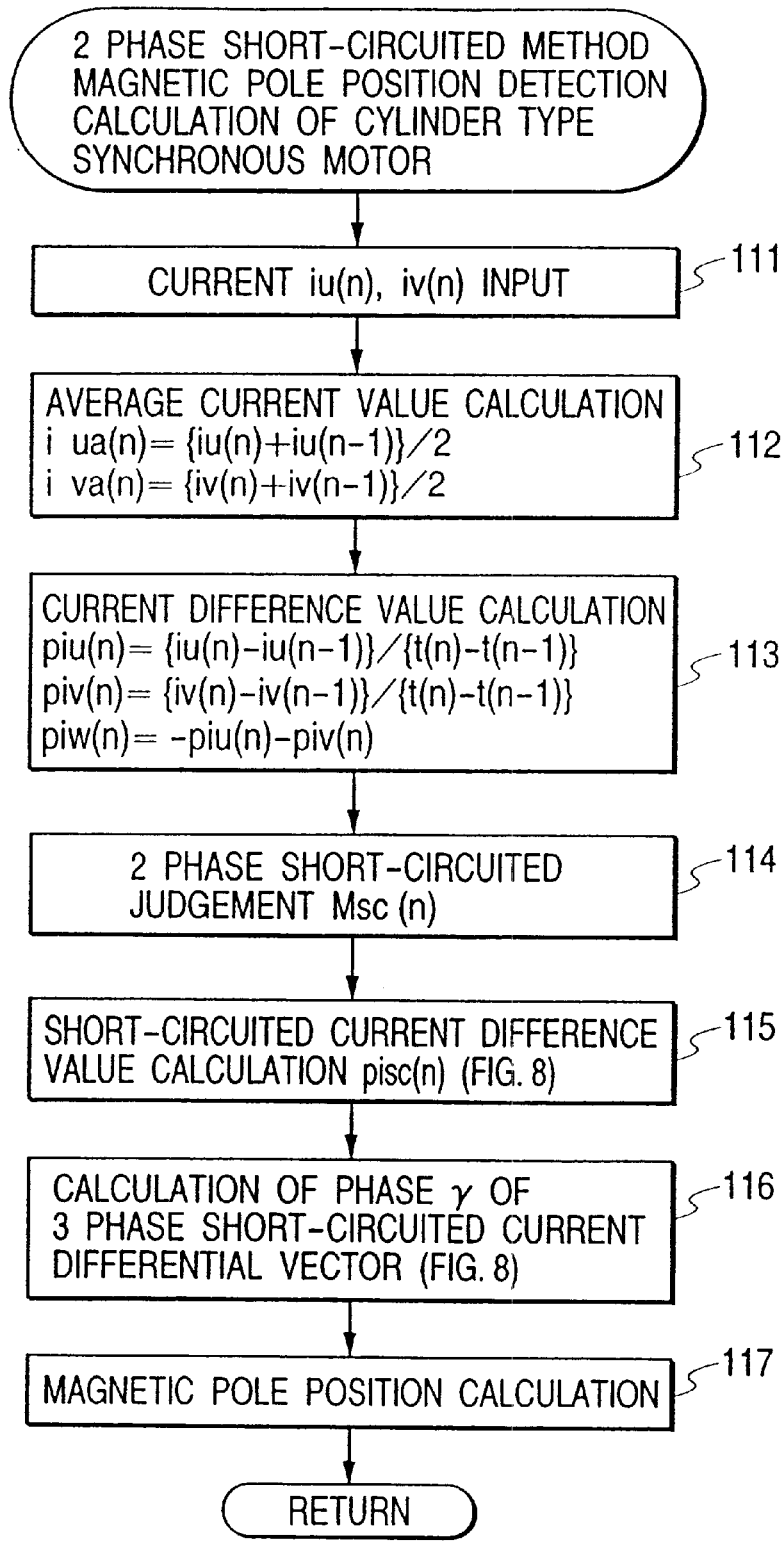

FIG. 8

| MODE | 2 PHASE SHORT-CIRCUITED (1) | 2 PHASE SHORT-CIRCUITED (2) | ARITHMETIC FORMULA |
|---|---|---|---|
| 1 | V-W PHASE SHORT-CIRCUITED $V\beta = 0$ $pi\,sc = pi\beta$ $= (piv - piw)/\sqrt{2}$ | W-U PHASE SHORT-CIRCUITED $V\beta' = 0$ $pi\,sc = pi\beta'$ $= (piw - piu)/\sqrt{2}$ | $\gamma = \tan^{-1}\left\{ \dfrac{-\sqrt{3}\cdot pi\beta}{(2pi\beta' + pi\beta)} \right\}$ |
| 2 | W-U PHASE SHORT-CIRCUITED $V\beta' = 0$ $pi\,sc = pi\beta'$ $= (piw - piu)/\sqrt{2}$ | U-V PHASE SHORT-CIRCUITED $V\beta'' = 0$ $pi\,sc = pi\beta''$ $= (piu - piv)/\sqrt{2}$ | $\gamma = \tan^{-1}\left\{ \dfrac{\sqrt{3}\,(pi\beta' + pi\beta'')}{(pi\beta' + pi\beta'')} \right\}$ |
| 3 | U-V PHASE SHORT-CIRCUITED $V\beta'' = 0$ $pi\,sc = pi\beta''$ $= (piu - piv)/\sqrt{2}$ | V-W PHASE SHORT-CIRCUITED $V\beta = 0$ $pi\,sc = pi\beta$ $= (piv - piw)/\sqrt{2}$ | $\gamma = \tan^{-1}\left\{ \dfrac{\sqrt{3}\cdot pi\beta}{(2pi\beta'' + pi\beta)} \right\}$ |

FIG. 14

| MODE | 2 PHASE SHORT-CIRCUITED (1) | 2 PHASE SHORT-CIRCUITED (2) | ARITHMETIC FORMULA |
|---|---|---|---|
| 1 | V-W PHASE SHORT-CIRCUITED<br>$V\beta = 0$<br>$pi\beta$<br>$pi\alpha$<br>$pisc = piy''$ | W-U PHASE SHORT-CIRCUITED<br>$V\beta' = 0$<br>$pi\beta$<br>$pi\alpha$<br>$pisc = piy$ | $\gamma = \tan^{-1}\left\{ \dfrac{-piy\cos(\pi/6+\varepsilon 2)+piy'\sin(\pi/6+\varepsilon 1)}{piy\sin(\pi/6+\varepsilon 2)+piy'\cos(\pi/6+\varepsilon 1)} \right\}$ |
| 2 | W-U PHASE SHORT-CIRCUITED<br>$V\beta' = 0$<br>$pi\beta$<br>$pi\alpha$<br>$pisc = piy$ | U-V PHASE SHORT-CIRCUITED<br>$V\beta'' = 0$<br>$pi\beta$<br>$pi\alpha$<br>$pisc = piy'$ | $\gamma = \tan^{-1}\left\{ \dfrac{piy'\cos(\pi/6-\varepsilon 3)+piy''\sin(\pi/6+\varepsilon 2)}{piy'\sin(\pi/6-\varepsilon 3)+piy''\cos(\pi/6+\varepsilon 2)} \right\}$ |
| 3 | U-V PHASE SHORT-CIRCUITED<br>$V\beta'' = 0$<br>$pi\beta$<br>$pi\alpha$<br>$pisc = piy'$ | V-W PHASE SHORT-CIRCUITED<br>$V\beta = 0$<br>$pi\beta$<br>$pi\alpha$<br>$pisc = piy''$ | $\gamma = \tan^{-1}\left\{ \dfrac{piy\cos(\pi/6-\varepsilon 3)+piy''\sin(\varepsilon 1)}{piy\cos(\pi/6-\varepsilon 3)+piy''\sin(\varepsilon 1)} \right\}$ |

SYNCHRONOUS MOTOR CONTROL DEVICE, ELECTRIC MOTOR VEHICLE CONTROL DEVICE AND METHOD OF CONTROLLING SYNCHRONOUS MOTOR

This application is a continuation of application Ser. No. 09/409,992, filed Sep. 30, 1999, now U.S. Pat. No. 6,281,656.

BACKGROUND OF THE INVENTION

1. Field of the Invention

The present invention relates to a control device which controls a synchronous motor including a reluctance motor, and a method of controlling a synchronous motor including a reluctance motor, and an electric motor vehicle control device using the same.

2. Conventional Art

In order to control such as speed and torque of a synchronous motor it is necessary to detect or estimate its magnetic pole position, and thus the speed and torque of the synchronous motor can be controlled through a current control or a voltage control thereof based on the detected or estimated magnetic pole position.

Conventionally, the magnetic pole position was detected by a position detector. However, recently a method of controlling a synchronous motor while estimating the magnetic pole position, in that a control method with magnetic pole position sensorless has been proposed which is different from the conventional method of detecting the magnetic pole position by making use of a position sensor.

For example, Takeshita, Ichikawa et al. "Control of Salient Type Brushless DC Motor with Sensorless Based on Estimation of Speed Electromotive Force" (Collected Papers of Japanese Electrical Engineers Society Vol. 117-D, No. 1, 1997) proposes a method of performing speed control of a motor while estimating a speed electromotive force by making use of a motor model.

Further, JP-A-8-205578 (1996) discloses a method of detecting a salient pole characteristic of a synchronous motor based on a correlation of ripple components of a voltage vector applied to the synchronous motor through a pulse width modulation control (hereinafter referred to as PWM control) and of the corresponding motor current vector.

The art disclosed in the above paper is a method of estimating the magnetic pole position based on a difference between a current calculated on the control model and an actual motor current flowing therethrough, and has a feature that a control system can be formed only through control calculations in a controller.

Further, since the art disclosed in JP-A-8-205578 (1996) uses general PWM signals which control a voltage of the synchronous motor, the method has an advantage that no additional signals for detecting the magnetic pole position are required.

Further, with the method of estimating magnetic pole position based on a difference between a current calculated from a control model and an actual motor current flowing therethrough, there was an unsolved problem that once the synchronous motor steps out on any causes, the synchronous motor may be brought into an out-of-control condition.

On the other hand, with the art disclosed in JP-A-8-205578 (1996) the magnetic pole position of the synchronous motor can always be detected by its salient pole characteristic, therefore, the synchronous motor is never brought into an out-of-control condition.

However, with the method of detecting the magnetic pole position of a synchronous motor through its salient pole characteristic, it is necessary to detect a correlation between the motor current state and the applied voltage every time when the PWM signals change.

Namely, it is necessary to detect the motor current state and to grasp the applied voltage state at least six times for one cycle of a carrier wave, for this reason there arose a problem that the calculation speed can not catch up with, if a controller of high performance is not used.

SUMMARY OF THE INVENTION

An object of the present invention is to provide a synchronous motor control device which can be produced with low cost.

Another object of the present invention is to provide a highly reliable synchronous motor control system.

One of the measures according to the present invention is to calculate, namely to estimate a magnetic pole position of the synchronous motor based on a variation amount or a variation direction of a motor current when the synchronous motor is put in a short circuited state and to control the synchronous motor based on the calculated magnetic pole position.

Other measures according to the present invention will be explained in the Detailed Description of the Preferred Embodiments.

BRIEF DESCRIPTION OF THE DRAWINGS

FIG. 7 is a flow chart when detecting magnetic pole position in the embodiment shown in FIG. 5;

FIG. 8 is a Table showing arithmetic expressions for calculating current difference values when two phases being short circuited and phases of current differential vectors when three phases being short circuited in steps 115 and 116 in FIG. 7;

FIG. 14 is a Table showing arithmetic expressions for calculating current difference values when two phases being short circuited and phases of current differential vectors when three phases being short circuited in steps 136 and 137 in FIG. 13;

DETAILED DESCRIPTION OF THE PREFERRED EMBODIMENTS

Hereinbelow, an embodiment of the present invention will be explained with reference to FIG. 1.

Figure 1:
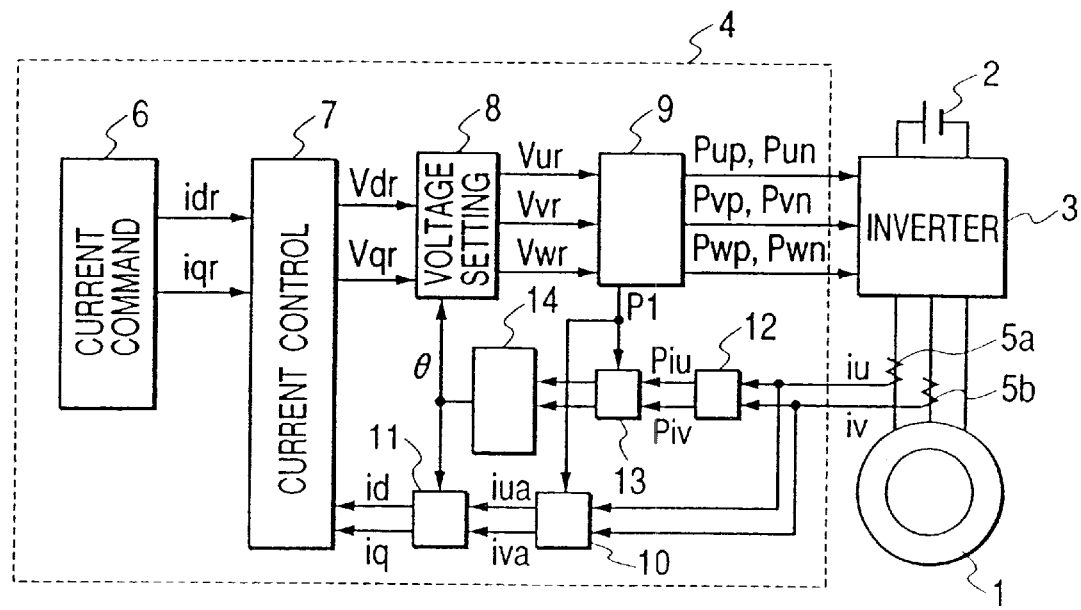
FIG. 1 is a block diagram showing one embodiment of the present invention in which a magnetic pole position of a cylinder type synchronous motor is detected by making use of a current differential circuit.

FIG. 1 is a block diagram of a motor control device in which a cylinder type synchronous motor 1 is driven by DC energy from a battery 2. The DC voltage of the battery 2 is inverted by an inverter 3 into a three phase AC voltage, which is applied to the cylinder type synchronous motor 1. The inverter 3 is controlled based on an output of a controller 4.

The output of the controller 4 is determined based on the following calculation result. Although the controller 4 in FIG. 1 is illustrated in a functional block diagram, the controller 4 can be realized not only by a hardware but also by a software. A differential circuit 12, a current detector unit 10 as well as a PWM signal generating unit 9, which will be explained later, use partly an input/output circuit of a computer. For example, the input/output circuit is such as an analogue/digital converter and a pulse output circuit, and through their use all of the functions can be performed by software programs.

Namely, at first a current command value generating unit 6 determines a d axis current command value idr and a q axis current command value iqr with respect to a torque command value τr to be generated from the motor 1. Further, the torque command value τr is issued to the current command value generating unit 6 from a control device or a control program which is in a higher hierarchy with respect to the controller 4.

The d axis is a direction in the magnetic pole or the magnetic fluxes, the q axis is electrically orthogonal direction to the d axis, and d axis and q axis in combination constitute d-q axes coordinate system. When a rotor with magnets of a motor rotates, the d-q axes coordinate system also rotates, therefore, a phase of the d-q axes coordinate system from a stationary coordinate system, in that α-β axes coordinate system, is assumed as θ. Namely, an object of the present embodiment is to detect the phase θ of the magnetic pole (hereinbelow, referred to as magnetic pole position θ) based on inverter currents.

Figure 17:
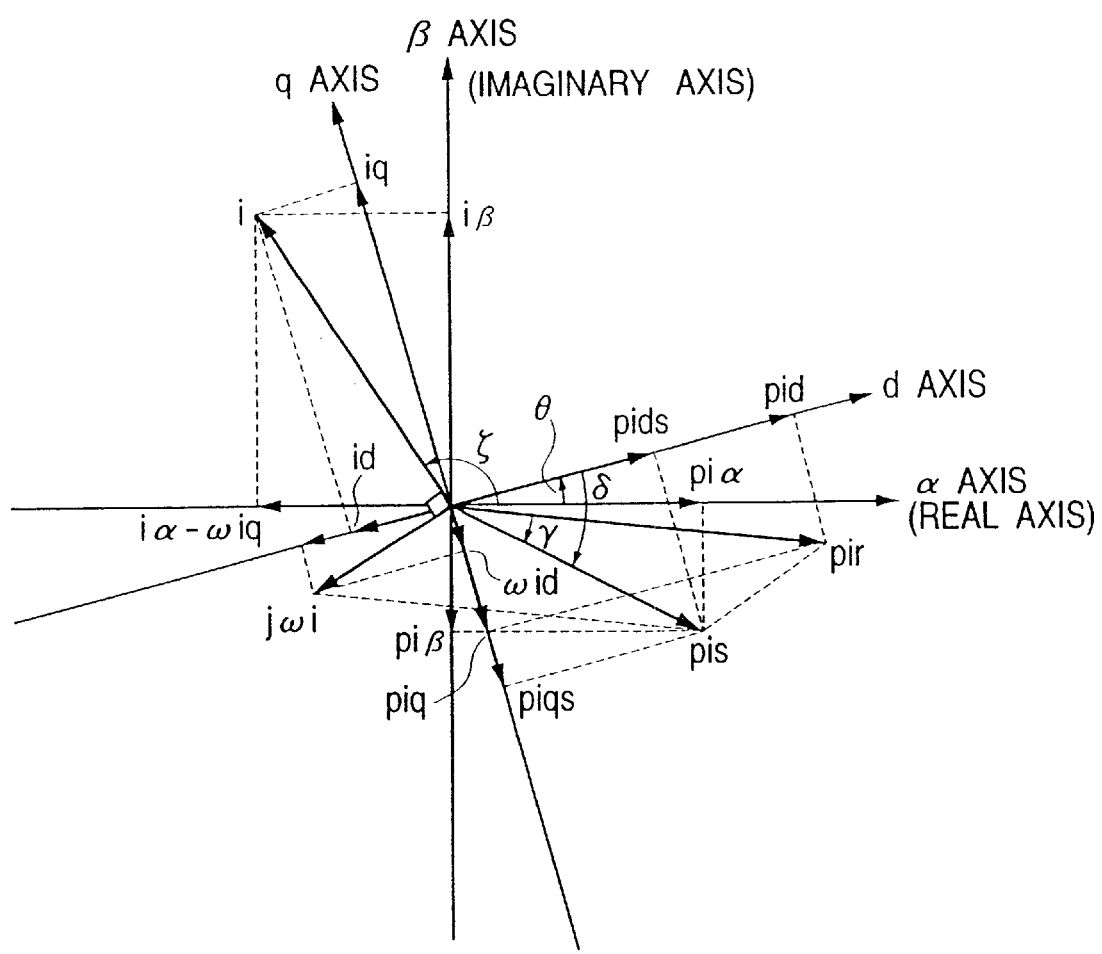
FIG. 17 is a vector diagram showing an exemplary relation between a current vector, a differential current vector and magnetic pole position, in other words, d axis in a synchronous motor.

FIG. 17 shows a vector diagram illustrating one exemplary relation between coordinate systems and currents therein. If the d axis current and the q axis current can be controlled according to the command values, the synchronous motor 1 can generate a torque coincident with the torque command value τr. The value of the torque command τr is commanded either directly to the current command value generating unit 6 or indirectly via a speed control calculating circuit (not showing). Signals respecting the values of a U phase current iu and a V phase current iv from current sensors 5a and 5b are sent to a current detecting unit 10 and are detected by the current detecting unit 10 at a current detection timing P1 which will be explained later. The detected current values are respectively converted by a coordinate system converting unit 11 into a d axis current id and a q axis current iq for the d-q axes coordinate system.

In the present embodiment, the currents detected by the current detecting unit 10 are two phase currents iu and iv of U phase and V phase, this is because W phase current iw can be determined by the U and V phase currents iu and iv and the detection of W phase current iw is omitted. Of course, all of the three phase currents can be detected.

A current control unit 7 calculates a d axis current deviation between the d axis current command value idr and the d axis current id and a q axis current deviation between the q axis current command value iqr and the q axis current, and performs a proportion and integration calculation for the respective deviations to determine a d axis voltage command value Vdr and a q axis voltage command value Vqr.

A voltage setting unit 8, which receives the d axis voltage command value Vdr and the q axis voltage command value Vqr, calculates three phase voltage command values Vur, Vvr and Vwr for the stationary coordinate system based on a magnetic pole position θ and outputs the same to a PWM signal generating unit 9.

The PWM signal generating unit 9 calculates three phase PWM pulses Pup, Pvp, Pwp, Pun, Pvn and Pwn and outputs the same to the inverter 3.

Figure 2:
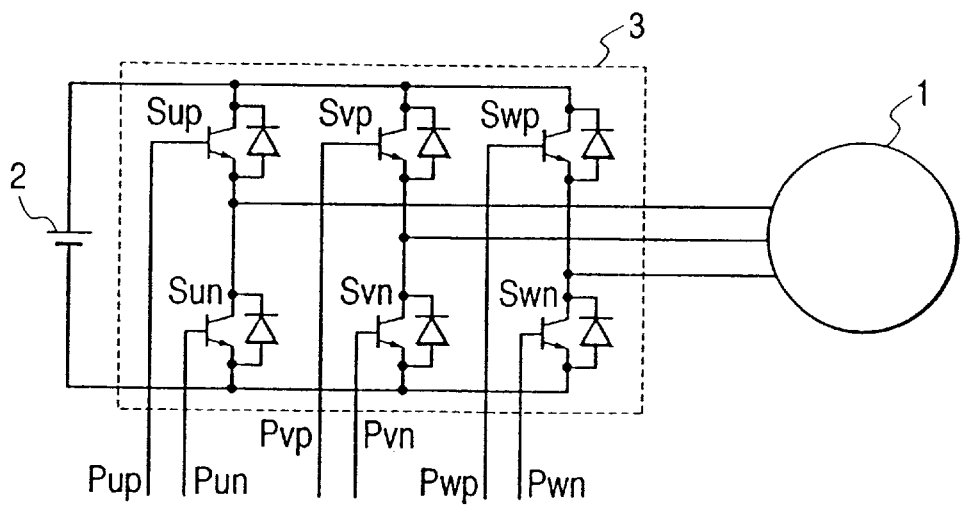
FIG. 2 is a circuit diagram of the inverter 3 in FIG. 1.

FIG. 2 shows a relation between the circuit connection diagram of the inverter 3 and the PWM pulses therefor. For example, when the PWM pulse Pup is high, a switching element Sup is turned on, and when the Pup is low, the switching element Sup is turned off.

Further, the PWM pulses Pup and Pun are generally in an opposite relation with regard to high and low state. However, in order to prevent a power source short circuiting, a short circuit preventing interval is provided which keeps the both PWM pulses in a low state, when the state of the PWM pulses are inverted.

Figure 3:
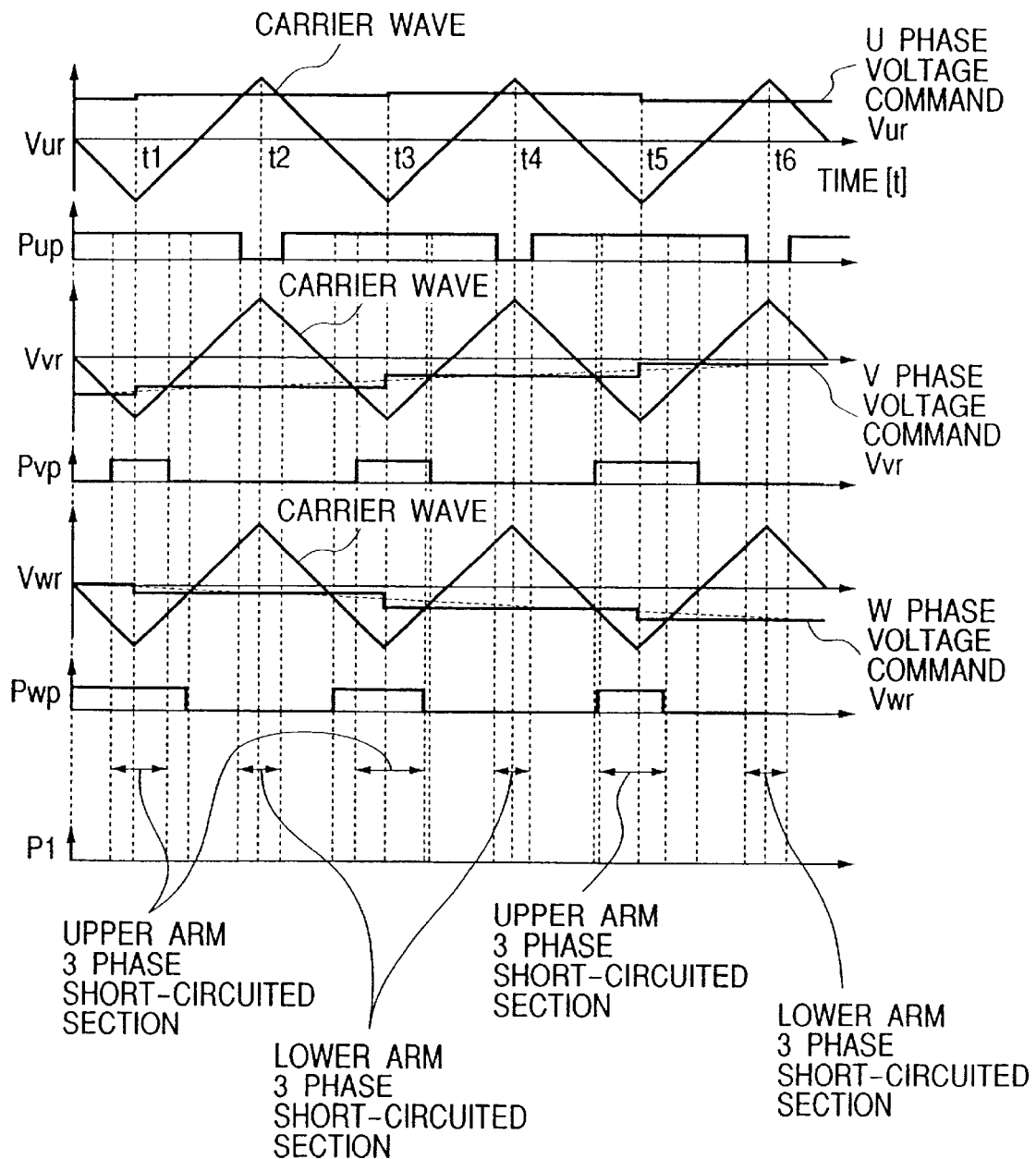
FIG. 3 is a time chart showing a relation between a carrier wave signal, three phase voltage command values and PWM signals, and a fetching timing of an inverter current in the embodiment shown in FIG. 1.

Processing contents performed in the PWM signal generating unit 9 are explained with reference to a timing chart as shown in FIG. 3. Through comparison of the wave forms of the respective phase voltage command values Vur, Vvr and Vwr with triangular wave shaped carrier waves, three phase PWM pulses Pup, Pvp and Pwp are obtained. Further, an illustration of the above mentioned short circuit preventing interval is omitted in the drawing for simplify the explanation.

Namely, when the PWM pulses Pup, Pvp and Pwp are in high in FIG. 3, the switching elements Sup, Svp and Swp in upper arms in FIG. 2 are respectively placed in an on state, and the switching elements Sun, Svn and Swn in lower arms therein are respectively placed in an off state. When the PWM pulses Pup, Pvp and Pwp are low, the switching elements Sun, Svn and Swn are respectively in an on state and the switching elements Sup, Svp and Swp are respectively in an off state.

As will be seen from FIG. 3, when the voltage command values of the respective phases are in a predetermined range including maximum value and minimum value of the carrier waves, there exists an interval in which three phases either in the upper arms or in the lower arms are in a short circuited condition. When the detection use pulse P1 is designed to be generated when the carrier wave reaches to its maximum value and to its minimum value, the detection use pulse P1 is resultantly generated when the three phases of the synchronous motor are in a short circuited state.

Further, it is known that when the current detection unit 10 is designed to detect the currents of the respective phases when the detection use pulse P1 is generated, the detected instantaneous current values substantially correspond to respective average current values of the concerned phases.

Still further, the short circuited state of respective phase windings in the synchronous motor exists not only at a moment of the maximum value and the minimum value of the carrier waves as shown in FIG. 3 but also exists in a predetermined range including the same. The predetermined range is represented by a pulse width among PWM pulses Pup, Pvp and Pwp having the narrowest pulse interval and by an interval between the most wide pulse and the adjacent pulse thereto. Timing t1 appears in a width range of pulse Pvp, timing t2 appears between two successive pulses Pup, timing t3 appears in a width range of pulse Pvp, timing t4 appears between another successive two pulses Pup, timing t5 appears in a width range of pulse Pwp and timing t6 appears between still another two successive pulses Pup. Still further, the timings t1 through t6 represent moments either the maximum value or the minimum value of the carries waves. As has been explained above during a predetermined interval including the moments of the respective maximum and minimum values the short circuited state of the phase winding is caused and which is repeated. In order to take out a current flowing through the windings under a short circuited state thereof, the pulse p1 is produced. It is sufficient when the pulse p1 is generated at the predetermined interval. The method according to the present embodiment in which the detection use pulses are generated at the timings of the maximum value and the minimum value of the carrier waves shows advantages such as that the detection use pulses are easy to produce and a possibility of erroneous operation is reduced, because the detection use pulses are generated at substantially the center period of the short circuited state.

Now, an important principle of the present embodiment as shown in FIG. 1 is explained.

A current differential circuit 12 is inputted of signals representing such as the U phase current iu and the V phase current iv and outputs differential current values piu and piv obtained by differentiating or affine differentiating the input current values.

These differentiated current values such as piu and piv are inputted into a detection unit 13 and are held until the detection use pulse P1 is generated, and thereafter are outputted. Namely, the current differential values piu and piv are detected at the timing of the pulses p1, in other words are fetched into a calculating unit 14.

Figure 4:
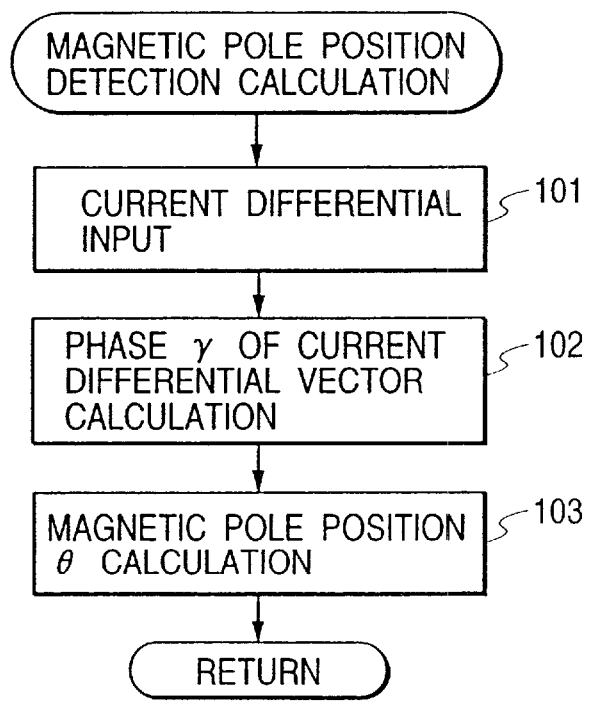
FIG. 4 is a flow chart when detecting magnetic pole position in the embodiment shown in FIG. 1.

The calculating unit 14 which calculates a magnetic pole position performs the processings as shown in the flow chart in FIG. 4 to determine the magnetic pole position θ.

At first, in step 101 the differentiated current values piu and piv when the three phases are short circuited, are inputted into the calculating unit 14.

In step 102, a phase γ of a differentiated current vector pis, when the three phases are short circuited, is calculated and determined.

In FIG. 17, phase relations of the differentiated current vector pis with respect to other vectors are illustrated. From the differentiated current values piu and piv when the three phases are short circuited an α axis differentiated current value piα and a β axis differentiated current value piβ can be determined.

When the U phase axis coincides with the α axis, the α axis differentiated current value piα and the β axis differentiated current value piβ are respectively obtained by the following arithmetic formulas;

$$pi\alpha = (\sqrt{3}/2)piu \quad (1)$$

$$pi\beta = (1/\sqrt{2})(piu - 2piv) \quad (2)$$

Subsequently, the phase γ is calculated based on the thus determined values piα and piβ by making use of the relations illustrated in FIG. 17.

In step 103, the magnetic pole position θ is determined according to the following arithmetic formula;

$$\theta = \gamma + \pi/2 \tag{3}$$

One of the feature of the present embodiment is our discovery that a relation between the magnetic pole position θ and the phase γ of the three phase short circuited current is approximately expressed by the above arithmetic formula (3) of which ground will be explained below.

Fundamental operation of a synchronous motor in d-q axes coordinate system are expressed by the following arithmetic formulas, wherein p=d/dt and ω represents a rotating angular speed of the motor;

$$Vd = (R + pLd)id - \omega Lqiq \tag{4}$$

$$Vd = (R + pLq)iq + \omega (Ldid + \phi) \tag{5}$$

When a synchronous motor is placed in a three phase short circuited state, the applied voltage of the synchronous motor stands Vd=Vq=0, therefore, the condition of the synchronous motor when the three phases are short circuited is expressed by the following arithmetic formulas;

$$pid = (\omega Lqiq - Rid)/Ld \tag{6}$$

$$piq = -\{\omega(Ldid + \phi) + Riq\}/Lq \tag{7}$$

The differentiated current vector in the stationary α-β axes coordinate system is a sum of the differentiated current vector in d-q axes coordinate system and a differentiated current vector generated through the rotation of the d-q axes coordinate system at an angular speed ω, therefore, a d axis differentiated current value pids and a q axis differentiated current value piqs seen from the α-β axes coordinate system are respectively expressed by the following arithmetic formulas;

$$pids = \{\omega(Lq - Ld)iq - Rid\}/Lq \tag{8}$$

$$piqs = -\{\omega(Ld - Lq)id + \phi) + Rid\}/Lq \tag{9}$$

Accordingly, the phase δ of the differentiated current vector when three phase are short circuited with respect to d axis, namely the magnetic pole position θ, is expressed by the following arithmetic formula;

$$\tan(\delta) = piqs/pids = -Ld[\omega\{(Ld-Lq)id+\phi\}+Rid]/[Lq\{\omega(Lq-Ld)iq-Rid\}] \tag{10}$$

In the present embodiment, since the cylinder type synchronous motor 1 is used, a condition Ld=Lq is given, therefore, the above arithmetic equation (10) is modified as follows;

$$\tan(\delta) = Ld(\omega\phi + Riq)/(LqRid) \tag{11}$$

When id<0, the phase δ is approximated by the following arithmetic formula;

$$\delta \approx -\pi/2 \tag{12}$$

For this reason, the calculation according to the arithmetic formula (3) is performed in step 103.

When the motor angular speed ω is low, the error based on the approximation (12) increases, therefore, the phase δ can be obtained asymptotically based on the arithmetic formula (11) of which method will be explained later in connection with other embodiments.

As has been explained above, through a simple calculation in the calculating unit 14 as shown in FIG. 1 the magnetic pole position θ can be determined. When coordinate conversions are performed in the voltage setting unit 8 and in the coordinate conversion unit 11 based on the thus determined magnetic pole position θ, the motor is controlled to generate a required torque corresponding to a torque command value.

Accordingly, the present embodiment is characterized by the fact that the magnetic pole position of a cylinder type synchronous motor can be detected through a comparatively simple calculation only with the provision of current sensors without using a mechanical magnetic pole position sensor such as a resolver and encoder which directly measures the rotating position of the magnetic pole of the cylinder type synchronous motor. For this reason the control device is produced with a low cost.

Further, even if the synchronous motor steps out on any causes, the synchronous motor is never brought into an out-of-control condition, because the magnetic pole position can always be detected.

Moreover, the present embodiment is characterized by the fact that in parallel with a usual PWM control since a sensorless control system is constructed only by making use of information obtained during the performance of the PWM control, noises and torque ripple of the synchronous motor are reduced in comparison with the conventional method of detecting the magnetic pole position by applying detection use additional signals.

Figure 5:
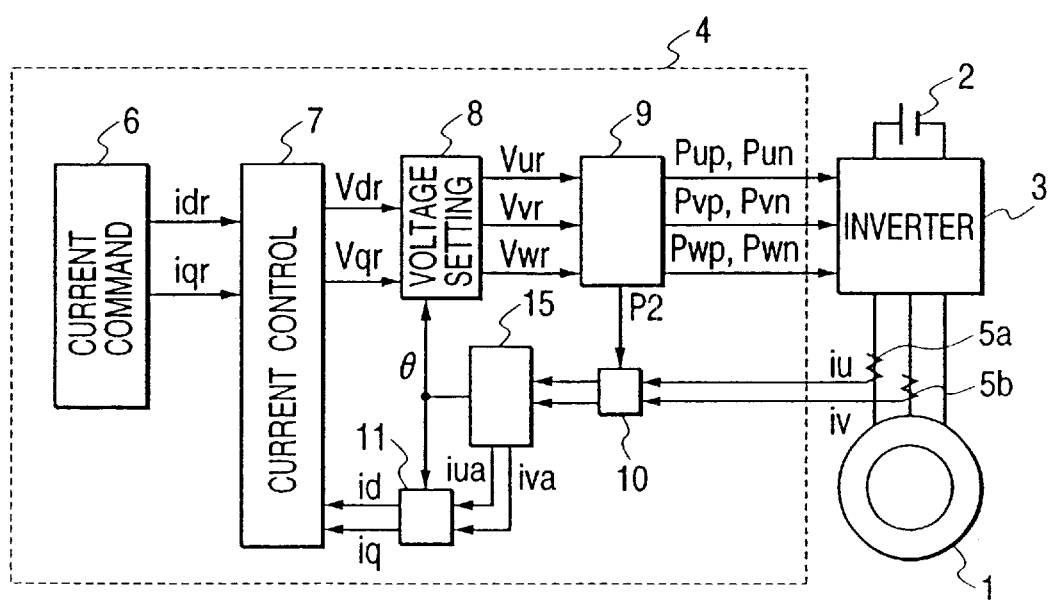
FIG. 5 is a block diagram showing another embodiment of the present invention in which the magnetic pole position is calculated by detecting motor currents when two phases of a cylinder type synchronous motor is under a short circuited condition.

FIG. 5 is a block diagram of another embodiment for a cylinder type synchronous motor in which the magnetic pole position is detected without using a current differential circuit. Like FIG. 1 embodiment, the present embodiment is also realized not only by electric circuits but also by computer softwares.

Major different points of the present embodiment from that shown in FIG. 1 embodiment are that the current differential circuit 12 is not used, the current detection timing is modified by an introduction of a detection use pulse P2 and a different processing other than that in the calculating unit 14 as shown in FIG. 1 is performed in the calculating unit 15. An important feature of the present embodiment is that the three phase short circuited current is not directly detected.

Figure 6:
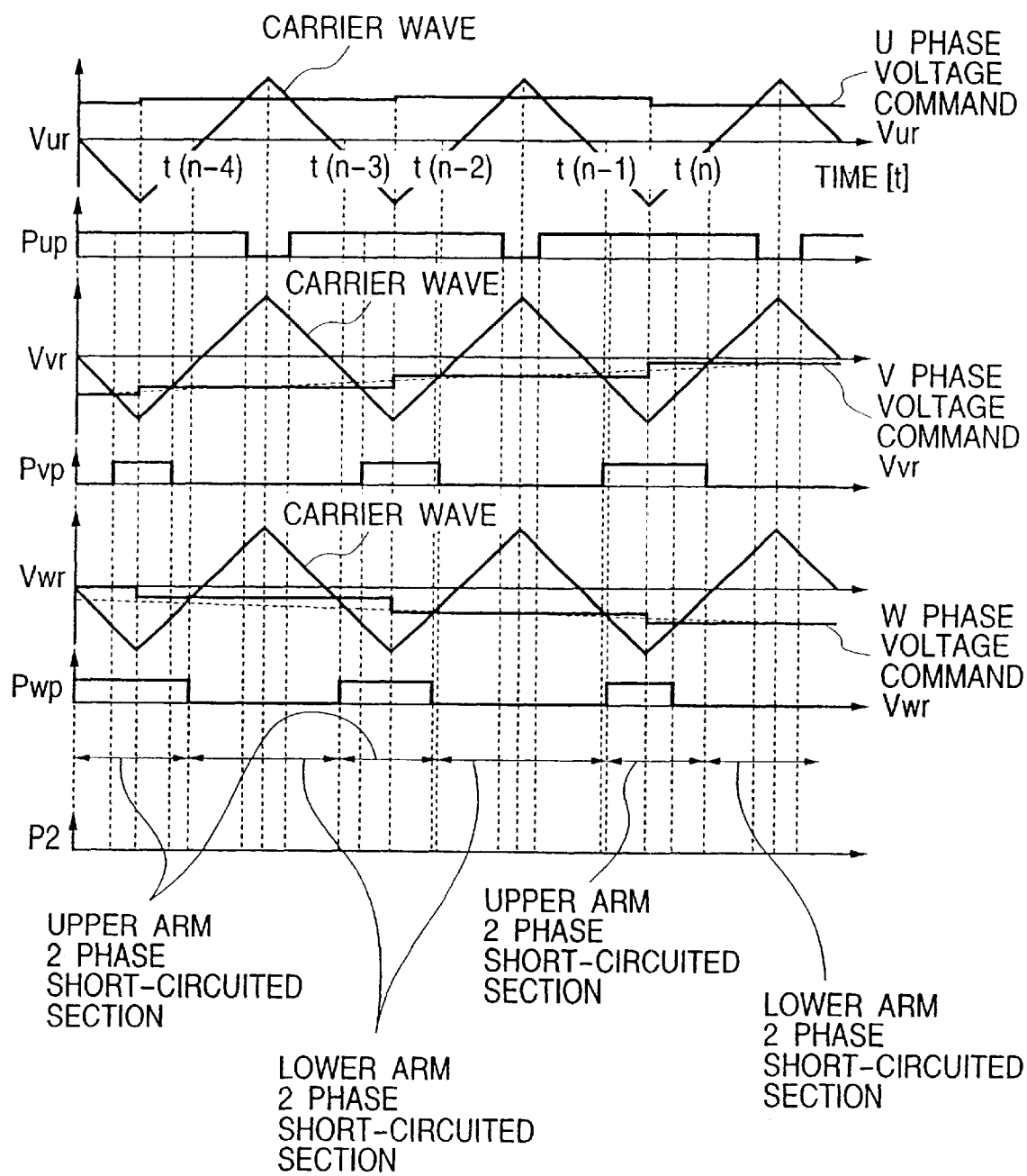
FIG. 6 is a time chart showing a relation between a carrier wave signal, three phase voltage command values and PWM signals, and a fetching timing of an inverter current in the embodiment shown in FIG. 5.

Now, the detection use pulse P2 which controls detection timing of the current detector unit 10 is explained with reference to FIG. 6. FIG. 6 shows the same state of PWM signals as that shown in FIG. 3, however, the current detection use pulses P2 as shown in FIG. 6 is different from the current detection use pulses P1 as shown in FIG. 3 in the following points.

With respect to respective phases of a 180° conduction type three phase inverter as shown in FIG. 2, either the switching element in the upper arm or the switching element in the lower arm is usually placed in an on state and the other is placed in an off state. For this reason, at least two phases among the three phases are always short circuited.

FIG. 6 illustrates such interval. For example, in a time section from time t(n−2) to time t(n−1) the switching elements Svn and Swn in the lower arms of V phase and W phase are placed in an on state, and the V phase and the W phase of the synchronous motor 1 are short circuited.

Further, in a time section from the time t(n−1) to time t(n) the U phase and the V phase are short circuited through the upper arms thereof.

As will be seen from the above, the 180° conduction type inverter has two modes of two phase short circuited state during one cycle of the carrier wave.

As illustrated in FIG. 6, the detection use pulses P2 are generated at the moment when the modes of two phase short circuited state charges over.

The PWM signal generating unit 9 is designed to produce the detection use pulses P2 in synchronism with the PWM signal which is generated from the phase having the second largest voltage command value, namely, the intermediate voltage command value (with regard to duration time, in other words pulse width), among the voltage command values for three phases.

The current detection unit 10 fetches, for example, signals representing two phase current values, a U phase current iu and a V phase current iv outputted from the current sensors 5a and 5b every time when the detection use pulses P2 are generated.

The U phase and V phase currents obtained at such timings are inputted from the current detection unit 10 to the calculating unit 15, in which the processings as shown in FIG. 7 are performed. A U phase average current value iua and a V phase average current value iva calculated in the calculating unit 15 are outputted to the coordinate system converting unit 11, and a magnetic pole position θ also calculated therein is outputted respectively from the calculating unit 15 to the voltage setting unit 8 and to the coordinate system converting unit 11 to perform substantially the same operation as that of FIG. 1 embodiment.

The flow chart of FIG. 7 illustrating processing contents performed in the calculating unit 15 is now explained.

A U phase average current iua(n) and a V phase average current iva(n) are calculated in step 112 by making use of a V phase current iu(n) and a V phase current iv(n) at time t(n) inputted from the current sensors 5a and 5b to the current detector unit 10 based on the detection use pulse P2 in step 111. An average of the U phase current iu(n−1) at time t(n−1) and the U phase current iu(n) at timing t(n) substantially corresponds to the value of V phase current iu at time t5 in FIG. 3. The processing in step 112 is performed because the U phase current at the generation timing of the current detection use pulses P1 substantially corresponds to the average value thereof.

In the next step 113, current difference values or differential values of respective phases between time t(n−1) and time t(n) are calculated.

In step 114, a two phase short circuited mode Msc is judged which two phases are in a two phase short circuited state in the time section from time t(n−1) to time t(n). In the present instance, it is understood that the upper arms of U phase and V phase are short circuited from FIG. 6, which is judged in step 114 to determine that the two phase short circuited mode Msc(n) is "U-V phase short circuited". Further, the previous two phase short circuited mode Msc (n−1) in the time section from time t(n−2) to time t(n−1) is "V-W phase short circuited".

In step 115, the calculation of the short circuited current difference values is performed by making use of the arithmetic formulas shown in the table in FIG. 8 to determine a short circuited current difference value pisc of short circuiting axis.

Now, the short circuited current difference value pisc of short circuiting axis is explained. In FIG. 8, when V-W phase short circuited, the short circuiting axis corresponds to β axis, when W-U phase short circuited, the short circuiting axis corresponds to β' axis, and when U-V phase short circuited, the short circuiting axis corresponds to β" axis.

For example, when converting three phase voltages into α-β axes coordinate system, in that to coincide the U phase axis with α axis, β axis voltage Vβ can be expressed by the following arithmetic formula;

$$V\beta = (Vv - Vw)/(\sqrt{2}) \tag{13}$$

wherein, when V-W phases are in a short circuited state, Vv=Vw, therefore Vβ=0. Namely, it is understood that the β axis is in a short circuiting state, accordingly the very axis is called as a short circuiting axis.

Likely, when W-U phases are short circuited, β' axis which is formed by rotating the β axis by 120° assumes the short circuiting axis, and when U-V are short circuited, β" axis which is formed by rotating the β axis by 240° assumes the short circuiting axis.

Figure 18:
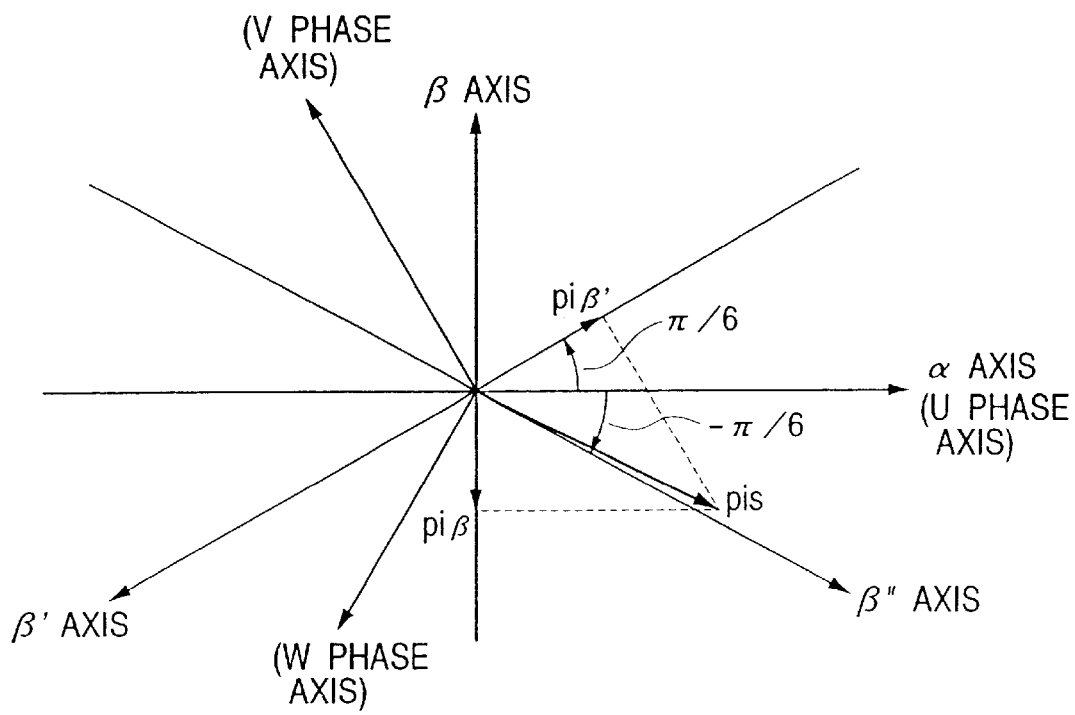
FIG. 18 is a vector diagram showing a relation between a differential current vector when two phases being short circuited and a differential current when three phases being short circuited in the cylinder type synchronous motor shown in FIG. 9.

In case of a cylinder type synchronous motor, the short circuited current difference value pisc of the short circuiting axis coincides with the short circuiting axis component of the three phase short circuited current differential vector pis. FIG. 18 shows a vector diagram representing these relations.

The reason why such vector diagram stands is explained by developing the arithmetic formulas (4) and (5).

The α axis current differential value piα and β axis current differential value piβ are respectively expressed as follows from the arithmetic formulas (4) and (5)

$$pi\alpha = [(L0 - L1\cos2\theta)V\alpha - (L1\sin2\theta)V\beta + \\ k1(\theta)i\alpha + k2(\theta)i\beta + k3(\theta)\phi]/(L0^2 - L1^2) \tag{14}$$

$$pi\beta = [-(L1\sin2\theta)V\alpha + (L0 + L1\cos2\theta)V\beta + \\ k4(\theta)i\alpha + k5(\theta)i\beta + k6(\theta)\phi]/(L0^2 - L1^2) \tag{15}$$

wherein, L0=(Ld+Lq)/2, L1=(Ld−Lq)/2, and k1(θ), k2(θ), k3(θ), k4(θ), k5(θ) and k6(θ) respectively represent functions relating to magnetic pole position θ.

In case of a cylinder type synchronous motor, since L1=0, it is understood that the β axis current differential value piβ affects no influence on the α axis voltage Vα.

When V-W phases are in a short circuited state, only the α axis voltage Vα is applied depending on the state of the U phase voltage Vu for the α axis current differential value piα, however, the β axis current differential value piβ is invariable at the time when Vα=0, moreover, since V-W phases are in a short circuited state, Vβ=0, therefore, this implies that the above β axis current differential value piβ coincides with the β axis current differential value piβ under the three phases being short circuited. With the hitherto explanation it will be considered that the vector relation as illustrated in FIG. 18 stands.

Likely, when W-U phases are short circuited, a β' axis current differential value piβ' becomes identical as the β' axis component of the three phase short circuited current differential vector pis. Accordingly, when a current differential value or a current difference value of a short circuiting axis under a two phase short circuited state is detected, the phase γ of the three phase short circuited current differential value can be calculated based on the vector diagram illustrated in FIG. 18.

When determining the phase γ of the three phase short circuited current differential value based on the two phase short circuited current mode Msc(n) and the two phase short circuited previous mode Msc(n−1), the calculation method thereof varies depending on the combination of the short circuited modes.

For this reason, in step 116 the phase γ of the three phase short circuited differential vector is determined by making use of one of separate arithmetic formulas each determined depending on the short circuited modes as illustrated in FIG. 8.

In step 117, a magnetic pole position θ is obtained in the same manner as in step 103 in FIG. 4.

The present embodiment as has been explained above has an advantage that a highly accurate detection of the magnetic pole position can be achieved with a limited current fetching, since the direction of the current differential vector under a three phase short circuited state can be determined, namely calculated by the current variation amount or difference value under the two phase short circuited state having a comparatively long duration time.

Further, the present embodiment uses no differential circuit, therefore, provides an advantage that a comparatively low cost controller having a high noise resistance can be realized.

Figure 9:
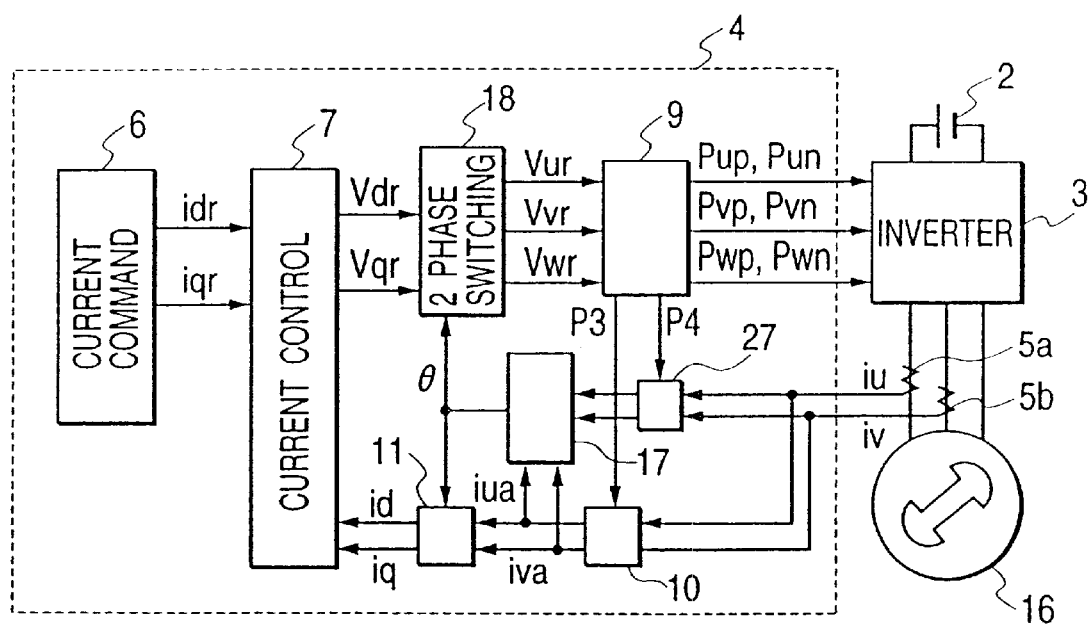
FIG. 9 is a block diagram showing still another embodiment of the present invention in which the magnetic pole position of a salient type synchronous motor is detected by making use of the inverter currents while prolonging the three phase short circuited interval.

FIG. 9 is a block diagram of still another embodiment in which the present invention is applied to a salient pole type synchronous motor. Like the previous embodiments, the controller 10 can be realized by electrical circuits as well as by computer softwares. The embodiment as shown in FIG. 9 differs from the previous embodiments as shown in FIGS. 1 and 5 in connection with the provision of a two phase switching calculation unit 18 and of current detection use pulses P3 and P4 generated from the PWM signal generating unit 9 and a processing method in the magnetic pole position calculating unit 17.

The processing content of the two phase switching calculating unit 18 is explained with reference to the time chart illustrated in FIG. 10.

The two phase switching implies a method in which while inhibiting switching of one phase among three phase PWM signals, the same sinusoidal currents as in the three phase switching are produced.

Figure 10:
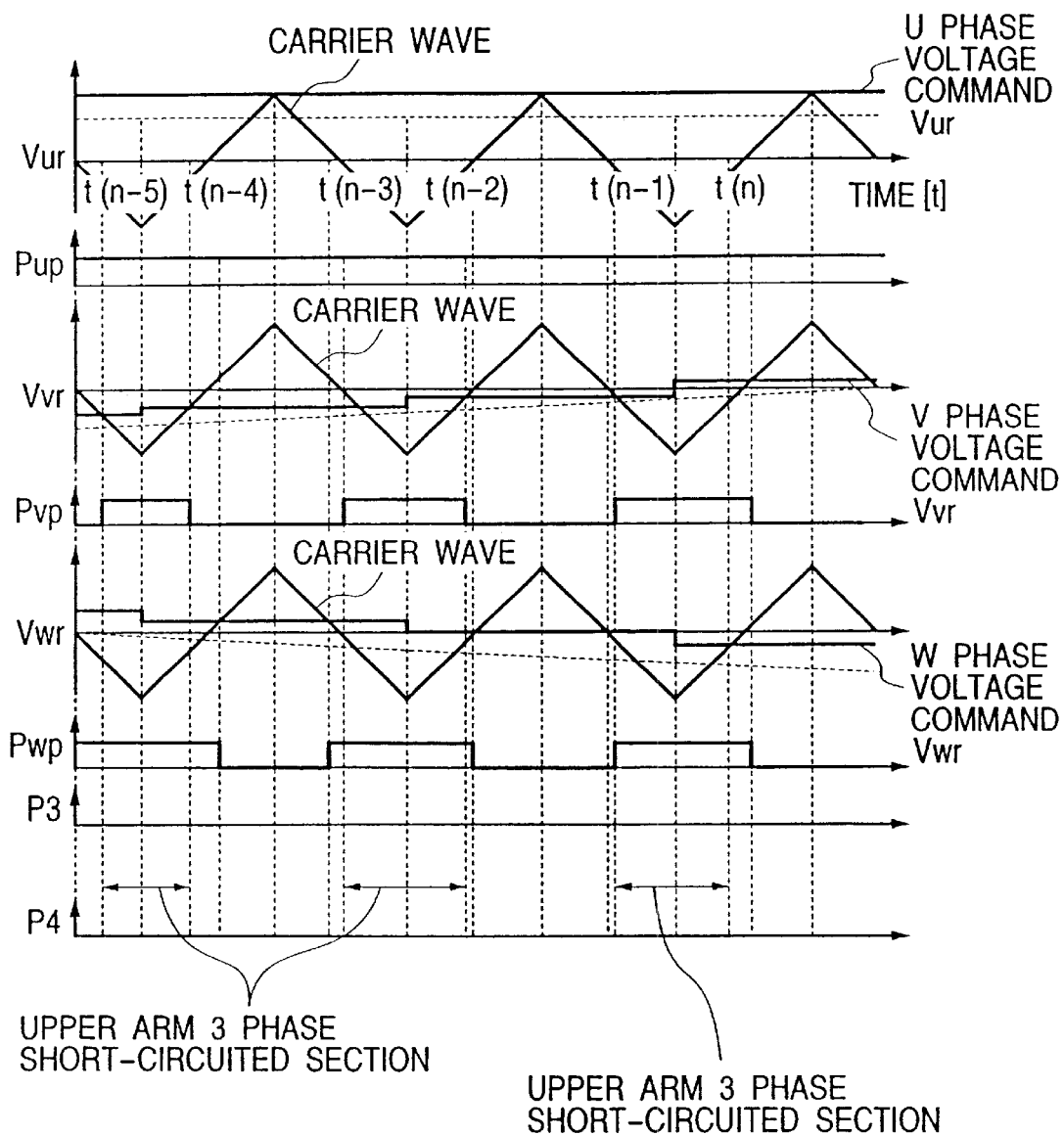
FIG. 10 is a time chart showing a relation between a carrier wave signal, three phase voltage command values and PWM signals, and a fetching timing of an inverter current in the embodiment shown in FIG. 9.

With FIG. 10, a method of causing a sinusoidal current like a three phase switching is explained, while, for example, preventing switching of U phase. V phase or W phase other than the U phase can be likely used as the switching prevention phase.

In FIG. 10, an additional voltage V0 is forcedly applied so that the U phase voltage command value Vur always assumes the same value as the maximum value of the carrier wave. Thereby, the U phase PWM signal Pup is always in a high state and the switching element Sup keeps an on state.

For V phase voltage command value Vvr and W phase voltage command value Vwr are determined by adding the additional voltage V0 to the respective usual command values, and depending thereon the respective PWM signals Pvp and Pwp are generated.

When a same voltage is added to all of the phase voltages, no influence is caused to their line voltages, the current flowing through the synchronous motor 1 is identical when no additional voltage is applied, which is a well known two phase switching method. When employing this method, the three phase short circuited state for one time is prolonged in comparison with the instance in FIG. 3 as will be seen from FIG. 10.

The detection use pulses P3 and P4 generated from the PWM signal generating unit 9 are also illustrated in FIG. 10.

The detection use pulses P3 are designed to be generated in synchronism with the maximum values of the carrier waves and are used so as to obtain the average current values ius and iva of the respective phases in the current detection unit 10 as shown in FIG. 9.

Further, the current detection use pulse P4 are designed to be generated in synchronism with the start and end of the prolonged three phase short circuited state. A current detecting unit 27 in FIG. 9 is inputted U phase current iu and V phase current iv in response to the current detection use pulses P4.

Figure 11:
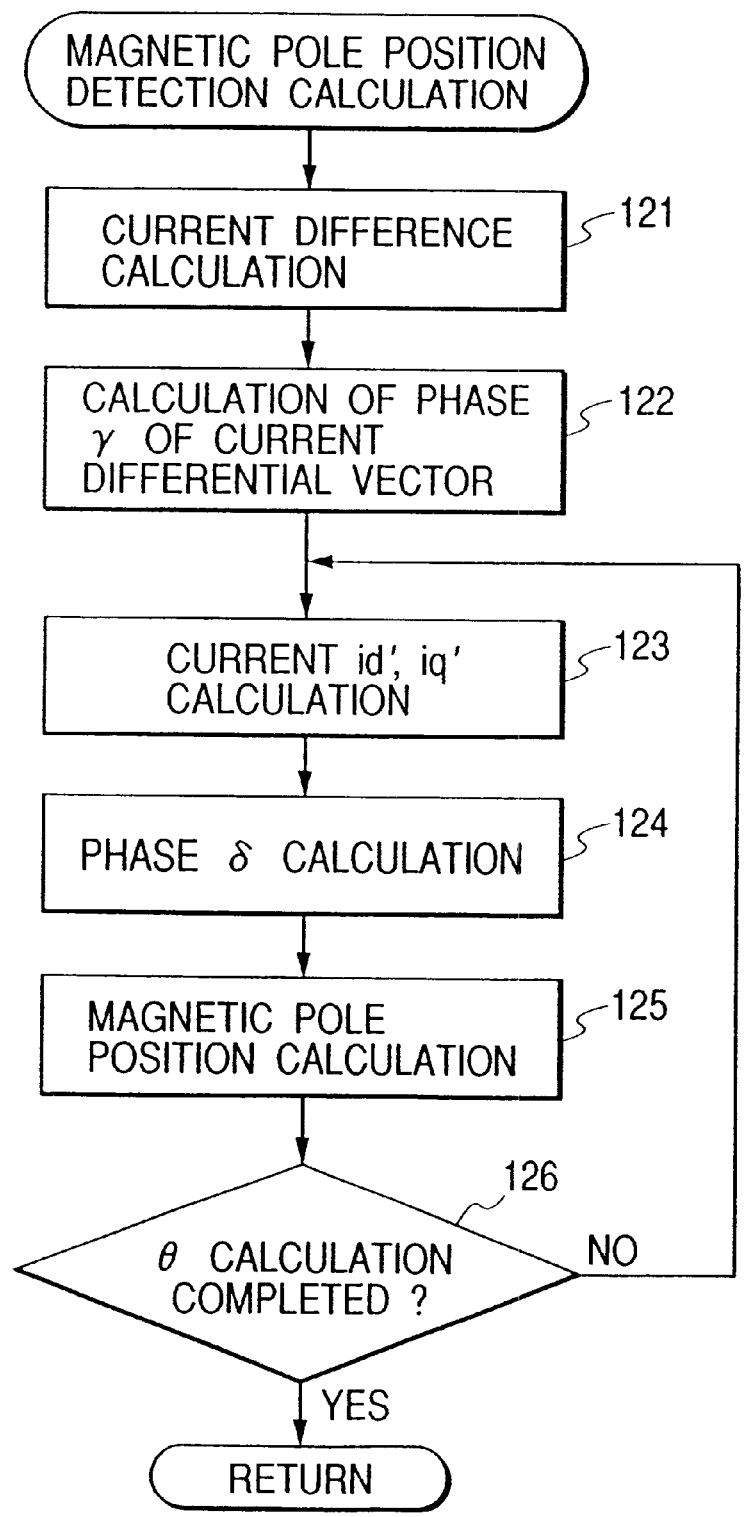
FIG. 11 is a flow chart when detecting magnetic pole position with a high accuracy in the embodiment shown in FIG. 9.

These detected current values are inputted into the calculating unit 17 where the processings as shown by the flow chart in FIG. 11 are performed to determine the magnetic pole position θ.

The processings as shown in FIG. 11 are performed in the following manner. In step 121, current difference values piu, piv and piw of the respective phases are calculated by making use of U phase current iu(n−1) and V phase current iv(n−1) at the start time t(n−1) of the three phase short circuited state and U phase current iu(n) and V phase current iv(n) at the end time t(n), of which processing is similar to that in step 113 in FIG. 7.

In the next step 122, the phase γ of the three phase short circuited current differential vector is calculated by making use of the current difference values piu, piv and piw, of which processing is also similar to that in step 102 in FIG. 4.

In the following steps, it is assumed that a magnetic pole position which is used for control in the controller 4 at that moment is θ' and an actual magnetic pole position of the synchronous motor 1 is θ. Further, it is also assumed that d axis current and q axis current calculated based on the magnetic pole position θ' used in the controller 4 are respectively id' and iq', and the actual d axis current and q axis current of the synchronous motor 16 are respectively id and iq.

In step 123, the d axis current id' and q axis current iq' are calculated by making use of the magnetic pole position θ' and of the average current values iua and iva inputted from the current detecting unit 10.

In step 124, a calculation according to the arithmetic formula (10) is performed by making use of id' and iq' instead of id and iq to determine the phase γ from the magnetic pole position, in other words d axis, to the three phase short circuited current differential vector.

When the motor angular speed ω exceeds a predetermined value, the phase γ can be determined according to the following approximate formula;

$$\tan(\delta) \approx -Ld\{(Ld-Lq)id+\phi\}/\{Lq(Lq-Ld)iq\} \quad (16)$$

In step 125, the magnetic pole position θ is determined according to the following arithmetic formula by making use of the phase γ obtained in step 122;

$$\theta = \gamma - \delta \quad (17)$$

The above relation is illustrated by the vector diagram in FIG. 17.

In step 126, it is judged whether the magnetic pole position θ is determined in step 125 is substantially coincident with the magnetic pole position θ' used for determining id' and iq' in step 123. If the both are not coincident, processings from the step 123 to the step 125 are again repeated to calculate the magnetic pole position θ.

When the magnetic pole position θ' used in the controller 4 differs from the actual magnetic pole position θ, id' and iq' do not coincide with id and iq, therefore, an error is caused in the phase δ. However, every time when performing the processings from step 123 to step 125, the error decreases and the magnetic pole position θ' used in the controller 4 converges to the actual magnetic pole position θ, which is judged in step 126 and if the calculation of the magnetic pole position substantially converges, the processings end.

Further, since it is estimated that the above calculation converges in a few times, for example two or three times, number of calculations, for example two times calculation, can be used to terminate the calculation instead of judging the calculation result of the magnetic pole position to ascertain the convergence.

Still further, in view of a relation between sampling time for detecting the magnetic pole position and motor angular speed, the step 126 can be omitted and a method of detecting the magnetic pole position by samplings of a few times can be employed.

As has been explained above, when detecting the magnetic pole position of a salient pole type synchronous motor, the magnetic pole position has to be calculated by making use of the d axis current id' and q axis current iq' including errors. A feature of the present embodiment is the provision of an argorism which can converge the errors, therefore, the present embodiment has an advantage in which a magnetic pole position sensorless control system for a salient pole type synchronous motor can be constructed by making use of current variation under a three phase short circuited state.

In the present embodiment, the variation range of the currents during the three phase short circuited period can be enlarged by incorporating a method of prolonging the three phase short circuited period such as the two phase switching method. For this purpose a method of detecting the magnetic pole position having a high noise resistance which can directly measure the three phase short circuited current differential vector without using a differential circuit can be realized by simple software processings.

Figure 12:
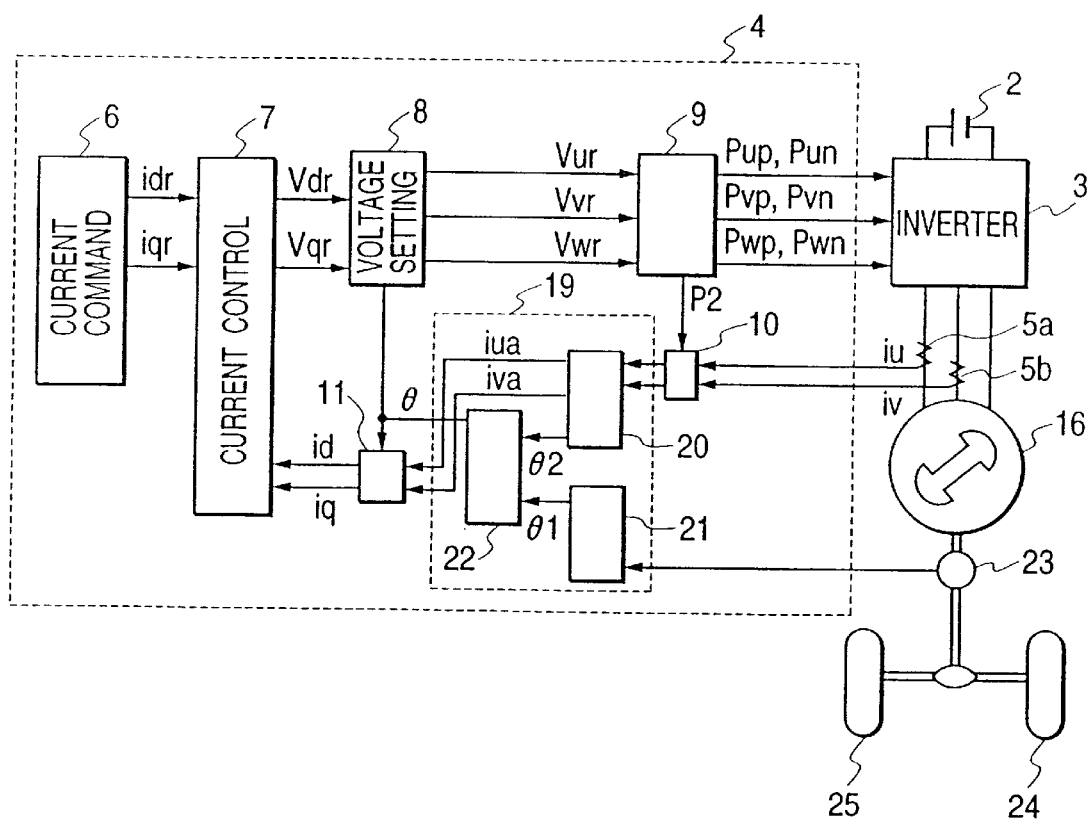
FIG. 12 is a block diagram showing a further embodiment of the present invention which comprises a magnetic pole position sensor for controlling a salient type synchronous motor for an electric motor vehicle and a magnetic pole position detecting means which detects the magnetic pole position thereof based on the inverter currents when two phases being short circuited.

FIG. 12 is a further embodiment of the present invention applied to a salient pole type synchronous motor including a highly reliable system suitable for application to an electric motor vehicle in which the magnetic pole position is detected in view of the two phase short circuited state. The controller 4 of the present embodiment can likely realized not only by electric circuits but also by computer software programs. Like the previous embodiments, the respective blocks of the controller 4 can be understood as representing the corresponding processing functions of the computer software programs.

A difference of the present embodiment as shown in FIG. 12 from the embodiment applied to a cylinder type synchronous motor as shown in FIG. 5 is the processings in a calculating unit 20.

Further, the salient pole type synchronous motor 16 is mechanically coupled to wheel tires 24 and 25 of the electric motor vehicle to drive the same.

Further, in order to enhance reliability of the electric motor vehicle, a magnetic pole position sensor 23 is provided which is designed to detect directly and mechanically the magnetic pole position of the motor.

Figure 13:
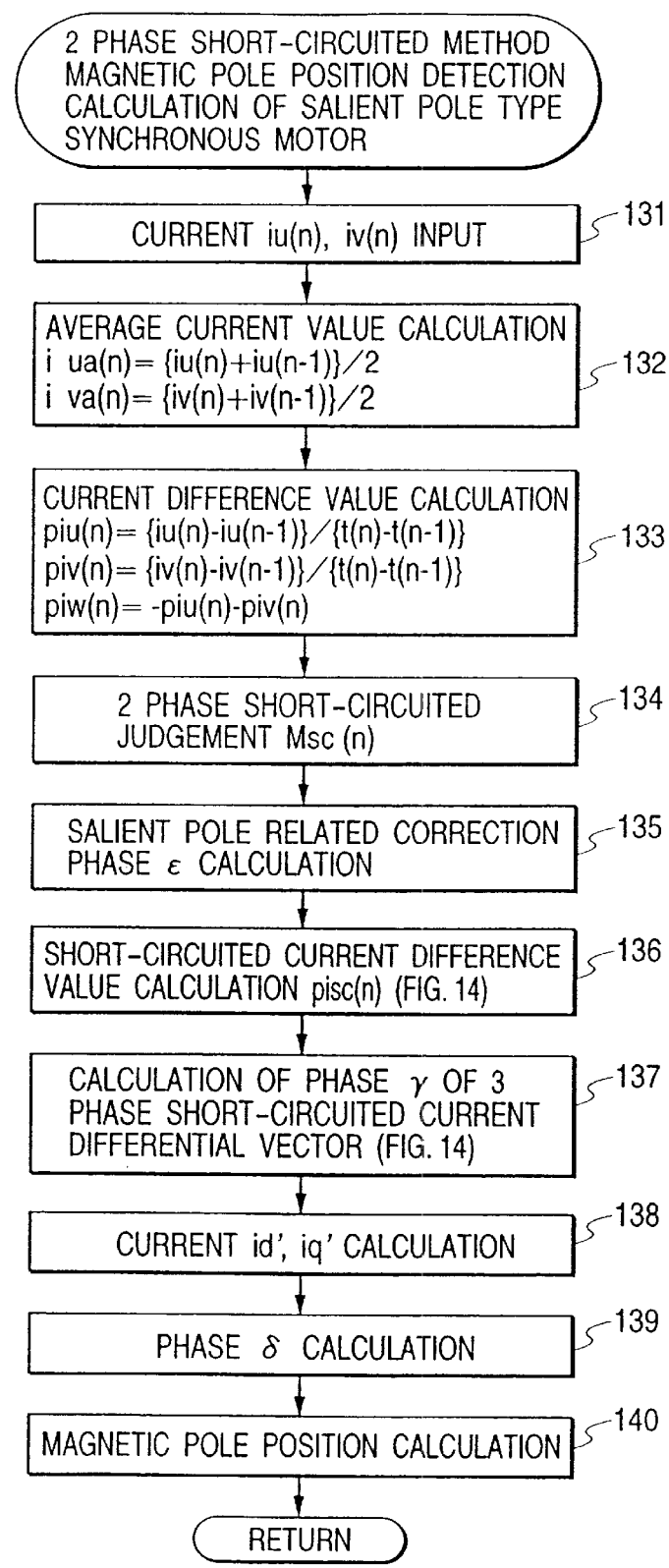
FIG. 13 is a flow chart when detecting the magnetic pole position of the salient pole type synchronous motor by making use of the inverter currents when two phases being short circuited in the embodiment shown in FIG. 12.

At first, the operation of the calculating unit 20 will be explained. The processings performed therein are illustrated in FIG. 13.

Processings performed from step 131 to step 134 are the same as performed from step 111 to step 114 in FIG. 7.

A salient pole related correction phase $\epsilon$ calculated in step 135 is a correction amount which is required to take into account of an influence of the salient pole related characteristic.

As will be seen from the arithmetic formula (15), in case of the salient pole type synchronous motor 16, since $L1 \neq 0$, the $\beta$ axis current differential value pi$\beta$ varies depending on the $\alpha$ axis voltage V$\alpha$. For this reason, the $\beta$ axis current differential value pi$\beta$ takes a different value from the $\beta$ axis component of the three phase short circuited current differential vector.

Figure 19:
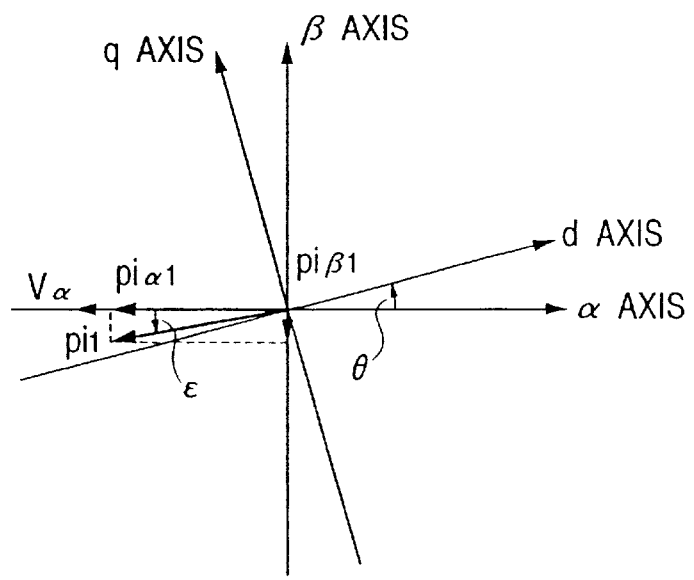
FIG. 19 is a vector diagram showing a relation between differential current vectors which are generated by a voltage applied on a axis of a salient pole type synchronous motor.

FIG. 19 illustrates a $\alpha$ axis current differential value pi$\alpha$1 and a $\beta$ axis current differential value pi$\beta$1 and a current differential pi1 compounded therefrom.

When assuming that the axis which coincides with the current differential vector pi1 is x axis, and another axis orthogonal thereto is y axis, the y axis component of the current differential vector pi1 is always zero regardless to the a axis voltage V$\alpha$. For this reason, the y axis component of the current differential vector pi1 coincides with the y axis component of the three phase short circuited current differential vector pis, which is called as the salient pole related correction phase $\epsilon$.

Therefore, in case of the salient pole type synchronous motor, the y axis current differential value or difference value which advances from the $\beta$ axis by the salient pole related correction phase $\epsilon$ is detected instead of the $\beta$ axis current differential value pi$\beta$.

Actually, since there are three types of two phase short circuited states, when assuming that the salient pole related correction phases for V-W phases short circuited, W-V phases short circuited and U-V phases short circuited are respectively represented as $\epsilon$1, $\epsilon$2 and $\epsilon$3 and the axes determined thereby are respectively represented as y axis, y' axis and y" axis, the salient pole related correction phases $\epsilon$1, $\epsilon$2 and $\epsilon$3 are respectively expressed as follows from the arithmetic formulas (14) and (15);

$$\tan(\epsilon1) = -(L1 \sin 2\theta)/(L0 - L1 \cos 2\theta) \tag{18}$$

$$\tan(\epsilon2) = -\{L1 \sin(2\theta - 4\pi/3)\}/\{L0 - L1 \cos(2\theta - 4\pi/3)\} \tag{19}$$

$$\tan(\epsilon3) = -\{L1 \sin(2\theta - 2\pi/3)\}/\{L0 - L1 \cos(2\theta - 2\pi/3)\} \tag{20}$$

Accordingly, in step 135 calculation according to one of the three arithmetic formulas (18), (19) and (20) is performed depending on the two phase short circuited state to determine a salient pole related correction phase $\epsilon$.

The magnetic pole position $\theta$ used in these calculations is one in the controller 4 and includes an error, therefore, if required, an accurate magnetic pole position can be determined and used while converging the same according to the processings as shown in FIG. 11.

In step 136, a corrected short circuited current difference value for a short circuited axis, in that either y axis, y' axis and y" axis, is calculated based on the current difference values piu(n) and piv(n) by making use of the Table in FIG. 14 to determine a short circuited current difference pisc for the converted short circuiting axis.

The short circuiting axis as has already been explained is an axis of which current differential value or difference value direction is not affected by the $\alpha$ axis voltage.

In the next step 137, the calculation mode is altered depending on the current and previous two phase short circuited states as illustrated in FIG. 14, and a phase $\gamma$ of the three phase short circuited current differential vector is determined by making use of one of three arithmetic formulas shown in FIG. 14.

Figure 20:
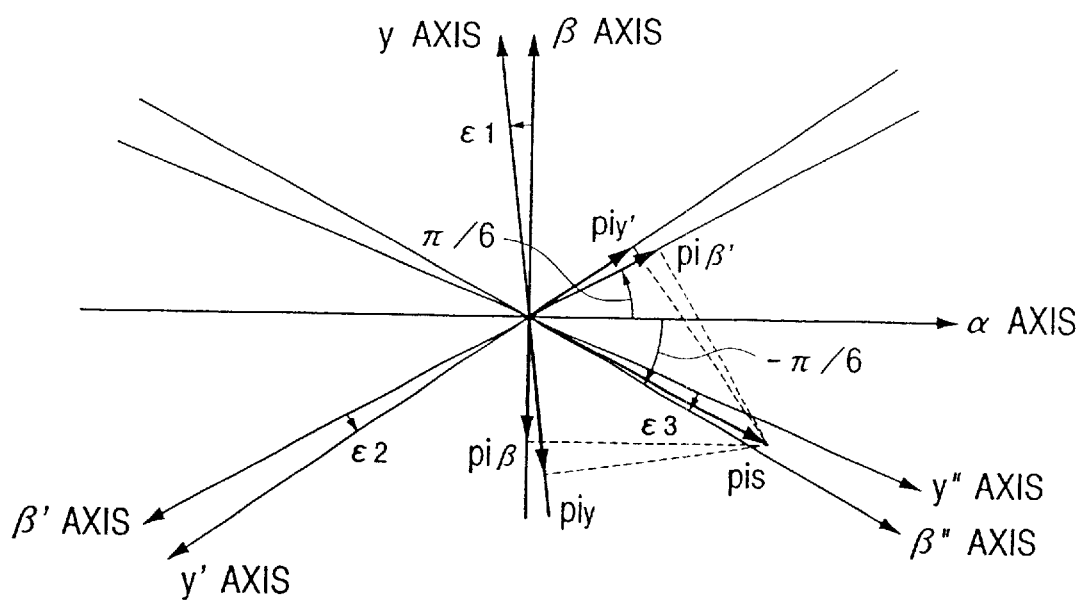
FIG. 20 is a vector diagram showing a relation between a differential current vector when two phases being short circuited and a differential current when three phases being short circuited in the salient pole type synchronous motor shown in FIG. 16.

FIG. 20 shows an example of vector diagrams which is determined according to the arithmetic formulas in FIG. 14.

The processings performed from step 138 to step 140 are identical to those performed from step 123 to step 125 in FIG. 11 which takes into account of the phase from the magnetic pole position of the salient pole type synchronous motor 16 to the current differential vector.

As will be understood from the above, when the calculating unit 20 is used, the magnetic pole position even for salient pole type synchronous motor 16 can be detected only by detecting a current under the two phase short circuited state thereof.

In the electric motor vehicle driving system as illustrated in FIG. 12, a signal from the magnetic pole position sensor 23 is inputted into a magnetic pole position detecting unit 21 to thereby detect a magnetic pole position $\theta$1.

Figure 15:
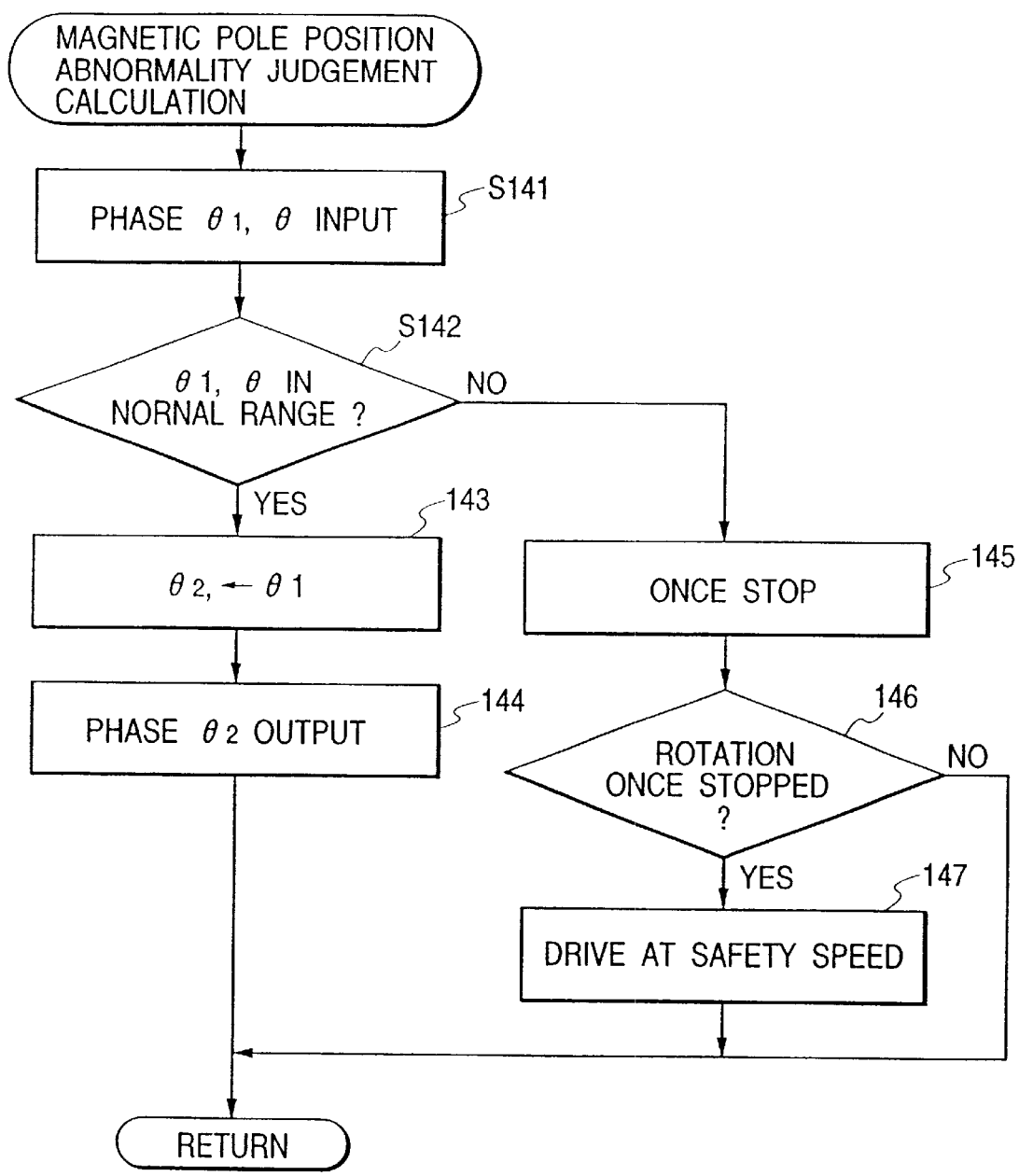
FIG. 15 is a flow chart when performing an abnormality judgement of the magnetic pole position in the embodiment shown in FIG. 12.

The magnetic pole position abnormality detecting unit 22 is inputted of the magnetic pole position $\theta$1 from the magnetic pole position detecting unit 21 and of the magnetic pole position $\theta$ from the magnetic pole position calculating unit 20, and performs the processings as illustrated in FIG. 15.

The magnetic pole position calculating unit 20, the magnetic pole position detecting unit 21 and the magnetic pole position abnormality detecting unit 22 in combination constitute a magnetic pole position and current calculating unit 19.

In step 142 the magnetic pole positions θ and θ1 inputted in step 141 are compared to judge whether the difference thereof is in a predetermined normality range.

When it is judged as normal, the magnetic pole θ1 is stored as an output use magnetic pole position θ2 in step 143, and in step 144 the output use magnetic pole position θ2 is outputted to the current setting unit 8 and to the coordinate system conversion unit 11.

When it is judged in step 142 that the comparison results of the two magnetic pole positions is outside the predetermined normal range, the processing of once stopping the electric motor vehicle is performed in step 145.

In step 146, it is judged whether the rotation of the synchronous motor once stopped. When the stoppage is judged, a drive of the electric motor vehicle is permitted in step 147 by making use of a normal magnetic pole position within a safety speed. The safety speed drive implies that the vehicle drives under a speed limit of 40 km/h or 50 km/h through control of a proper control device (not shown).

The advantage of the present embodiment is that a highly reliable electric motor vehicle control device can be provided with the introduction of the magnetic pole position sensor 23 and through the determination of the magnetic pole position based on the magnetic pole position sensor 23 as well as through the determination of the magnetic pole position by the calculation processing of the motor currents.

In particular, the present embodiment is suitable when the size reduction of the motor through use of reluctance torque and light weighting of the electric motor vehicle are intended.

Figure 16:
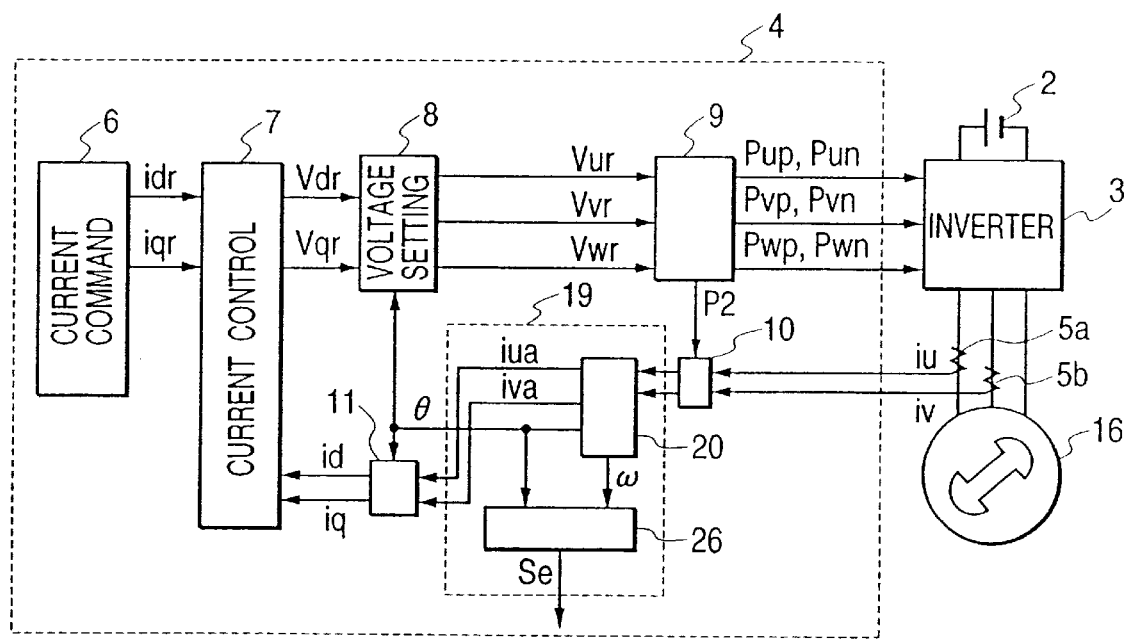
FIG. 16 is a block diagram showing a still further embodiment of the present invention which includes a self diagnosis function of false detection in magnetic pole position in a salient pole type synchronous motor having a magnetic pole position detecting means detecting the magnetic pole position by making use of inverter currents when two phases being short circuited.

FIG. 16 is a block diagram of a still further embodiment of the present invention including a magnetic pole position sensorless control system which detects the magnetic pole position only with a current sensor, and moreover has a self diagnosis function to determine abnormality in the detecting characteristics.

A feature of the present embodiment as shown in FIG. 16 with respect to the embodiment as shown in FIG. 12 is the provision of a self diagnosis unit 26.

The magnetic pole position calculating unit 20 performs a calculation of detecting a motor angular speed ω in addition to the processings as illustrated in FIG. 13.

In the previous embodiments, the magnetic pole position θ is obtained by detecting phase γ of the current differential vector, and information relating to the magnitude of the current differential vector is neglected.

Herein, the motor angular speed ω is determined as follows by making use of the arithmetic formulas (6) and (7);

$$\omega = (Ldpid + Rid)/Lqiq \quad (21)$$

$$\omega = -(Lqpiq + Riq)/(Ldid + \phi) \quad (22)$$

The arithmetic formulas (21) and (22) can be modified into simple arithmetic formulas by neglecting the resistance R. The thus calculated motor angular speed ω is outputted to the self diagnosis unit 26.

Further, the magnetic pole position θ obtained in step 140 in FIG. 13 is also inputted into the self diagnosis unit 26.

In the self diagnosis unit 26 it is judged through comparison of the variation of the magnetic pole position with the motor angular speed ω whether any abnormality in the system occurs.

If it is judged there is an abnormality, the self diagnosis unit 26 outputs an abnormality diagnosis signal Se to stop the operation of the sensorless control system.

In the present embodiment as has been explained above, through estimation of the motor angular speed by making use of a plurality of independent variables of the current differential vectors, a self diagnosis function is provided without using an additional sensor.

The present invention is applicable to a reluctance motor other than the synchronous motor by making use of its salient pole related characteristic.

Further, in the above embodiments an influence due to rotation of the motor rotor during a sampling period on the calculation of the magnetic pole position is neglected for the sake of explanation simplicity, however, such influence can be taken into account for the calculation of the magnetic pole position.

In the above embodiments, an application to an electric motor vehicle is exemplified. However, the present invention is also applicable to a magnet motor which is presently sensorlessly controlled by making use of 120° conduction type inverter so as to obtain a sensorless control system with small torque ripple and low noises controlled by a 180° conduction type inverter.

The embodiments as has been explained in connection with FIGS. 1 through 20 are preferable for a control in which the synchronous motor 1 is rotated above a predetermined rotating speed, for example more than 800 rpm. When the motor is rotated under a low speed including stoppage thereof, it is sometimes necessary to detect the magnetic pole position with further higher accuracy which will be explained later. An embodiment which permits the detection of the magnetic pole position with higher accuracy under a low speed including stoppage of the motor will be explained with reference to FIG. 21. An important difference of FIG. 21 embodiment from FIG. 1 embodiment is the provision of a calculating unit 52 which is detectable of the magnetic pole position when the synchronous motor is rotated under a low speed including stoppage thereof. The controller 4 of the present embodiment can likely realized not only by electric circuits but also by computer software programs. Like the previous embodiments, the respective blocks of the controller 4 can be understood as representing the corresponding processing functions of the computer software programs.

The processings performed in the calculating unit 14 for detecting the magnetic pole position are the same as those explained in connection with FIG. 1. Further, the operations of the current command value generating unit 6, the current control unit 7, the coordinate system conversion unit 8, the PWM signal generating unit 9, the current detection unit 10, the coordinate system conversion unit 11 and the inverter 3 are also fundamentally the same as those explained in connection with FIG. 1. The processing method performed for calculating the magnetic pole position of the synchronous motor based on the variation amount of the motor current or the variation direction thereof when the synchronous motor 3 is placed in a three phase short circuited state is again explained.

In the present calculating method of the magnetic pole position, the magnetic pole position is calculated and determined based on the variation amount of the motor current or the variation direction thereof under a three phase short circuited state which is free from an influence of the applied voltage from the inverter 3. In order to detect the variation amount of the motor current or the variation direction thereof under the three phase short circuited state, pulses P1 are generated which control the timing under the three phase short circuited state as has been explained in connection with FIG. 3. As typical examples, the pulses P1 are generated at the timings of the maximum value, the minimum value or the both values of the carrier waves as shown in FIG. 3, and in synchronism with these pulses P1 the current values or the differential values thereof are detected. Namely, the pulses P1 are generated from the PWM signal generating unit 9 and the variation amount of the motor is detected by using the pulses P1 as signals, in other words as triggers, representing the three phase short circuited state of the motor. The relation of the vector namely the differential vectors of the motor current variation amount detected at the time when the three phases are short circuited is the same as that explained in connection with FIG. 17. In FIG. 17, the magnetic pole position to be detected is the phase θ between α axis of the stationary coordinate system and d axis of the rotary coordinate system, namely the phase θ is expressed by the following arithmetic formula (17);

$$\theta = \gamma - \delta \quad (17)$$

wherein γ represents a phase of motor current differential vector pis, when the three phases are short circuited with respect to α axis, and δ is a phase of the motor current differential vector pis with respect to d axis.

The calculation of the phase γ is performed in the following manner;

At first the motor currents iu and iv are differentiated in the differential circuit 12, and further in synchronism with the detection use pulses P1 generated when the motor is under a short circuited state the differential values piu and piv of the motor currents when the motor is short circuited are fetched at the current differential value detector unit 13. Further, these motor current differential values piu and piv when the motor is short circuited are converted into current differential values piα and piβ for α-β axes according to the following arithmetic formulas (1) and (2), thereafter, the phase γ is calculated according to the following arithmetic formula (23);

$$pi\alpha = (\sqrt{3}/2)piu \quad (1)$$

$$pi\beta = (1/\sqrt{2})(piu + 2piv) \quad (2)$$

$$\gamma = \tan^{-1}(pi\beta/pi\alpha) \quad (23)$$

In the above, although piα and piβ are determined by making use of the two phase current differential values piu and piv, the three phase current differential values piu, piv and piw can be used for the calculation. In the present embodiment the differential circuit is used for calculating the current differential values when the three phases are short circuited, however, when the incorporation of such differential circuit is impossible, instead of the current differential values current variation rates can be used which are determined by calculating current variation amounts in the three phase short circuited interval time and by dividing the current variation amounts by the respective short circuited interval times. Still further, if the short circuited interval times are extremely short and the calculation of the current variation rates in the three phase short circuited interval is impossible, the current variation rates in the three phase short circuited interval can be calculated by making use of two phase short circuited intervals which is absolutely longer than the three phase short circuited interval. As has been explained above in detail, the phase γ of the motor current differential vector pis when the three phases are short circuited with respect to α axis is determined.

The calculation of the phase δ of the motor current differential vector pis with respect to d axis is performed in the following manner:

At first, the fundamental behavior of a synchronous motor in d-q axes of rotary coordinate system is expressed by the following arithmetic formulas (4) and (5) as has been explained previously;

$$Vd = (R + pLd)id - \omega Lqiq \quad (4)$$

$$Vd = (R + pLq)iq + \omega(Ldid + \phi) \quad (5)$$

wherein, Vd and Vq are d-q axes voltages, Ld and Lq are d-q axes inductances, R is a winding resistance, ω is motor angular velocity, φ is main fluxes of magnetic field and P is d/dt. In the above arithmetic formulas, when the three phases are short circuited, the applied voltage in d-q axes assumes zero, therefore, the above fundamental arithmetic formulas are modified as follows;

$$pid = (\omega Lqiq - Rid)/Ld \quad (6)$$

$$piq = -\{\omega(Ldid + \phi) + Riq\}/Lq \quad (7)$$

The differentiated current vector in the stationary α-β axes coordinate system is expressed by a sum of the differentiated current vector in d-q axes coordinate system as expressed by the arithmetic formulas (6) and (7) and a differentiated current vector generated through the rotation of the d-q axes coordinate system at an angular speed ω, therefore, a d axis differentiated current value pids and a q axis differentiated current value piqs seen from the α-β axes coordinate system are respectively expressed by the following arithmetic formulas;

$$pids = \{\omega(Lq - Ld)iq - Rid\}/Ld \quad (8)$$

$$piqs = -\{\omega(Ld - Lq)id + \phi) + Riq\}/Lq \quad (9)$$

Accordingly, the phase δ of the motor current differential vector pis with respect to d axis is expressed by the following arithmetic formula (24)

$$\delta = \tan^{-1}(piqs/pids) \quad (24)$$
$$= \tan^{-1}[-Ld\{\omega((Ld - Lq)id + \phi) + Riq\}/\{Lq(\omega(Lq - Ld)iq - Rid)\}]$$

Resultantly, with the arithmetic formulas (17), (23) and (24) the magnetic pole position can be determined. Wherein, as the ω included in the arithmetic formula (24), an estimated angular velocity value determined by a variation amount of a phase estimation value. Further, in an operating region where the angular velocity is sufficiently large and component R is negligible, an influence of ω is eliminated.

Above is the outline of the position detecting method of detecting the magnetic pole position of a synchronous motor based on the variation amount of the motor current or the variation direction thereof when the three phases of the synchronous motor are short circuited. The present method can be applicable not only to a salient pole type synchronous motor but also to a cylindrical type synchronous motor.

In the present position detecting method, since the current variation amount under the motor short circuited state which is caused during usual PWM operation, estimation of the magnetic pole position is enabled up to a high speed operation range without applying any specific estimation signals.

Figures 21, 22:
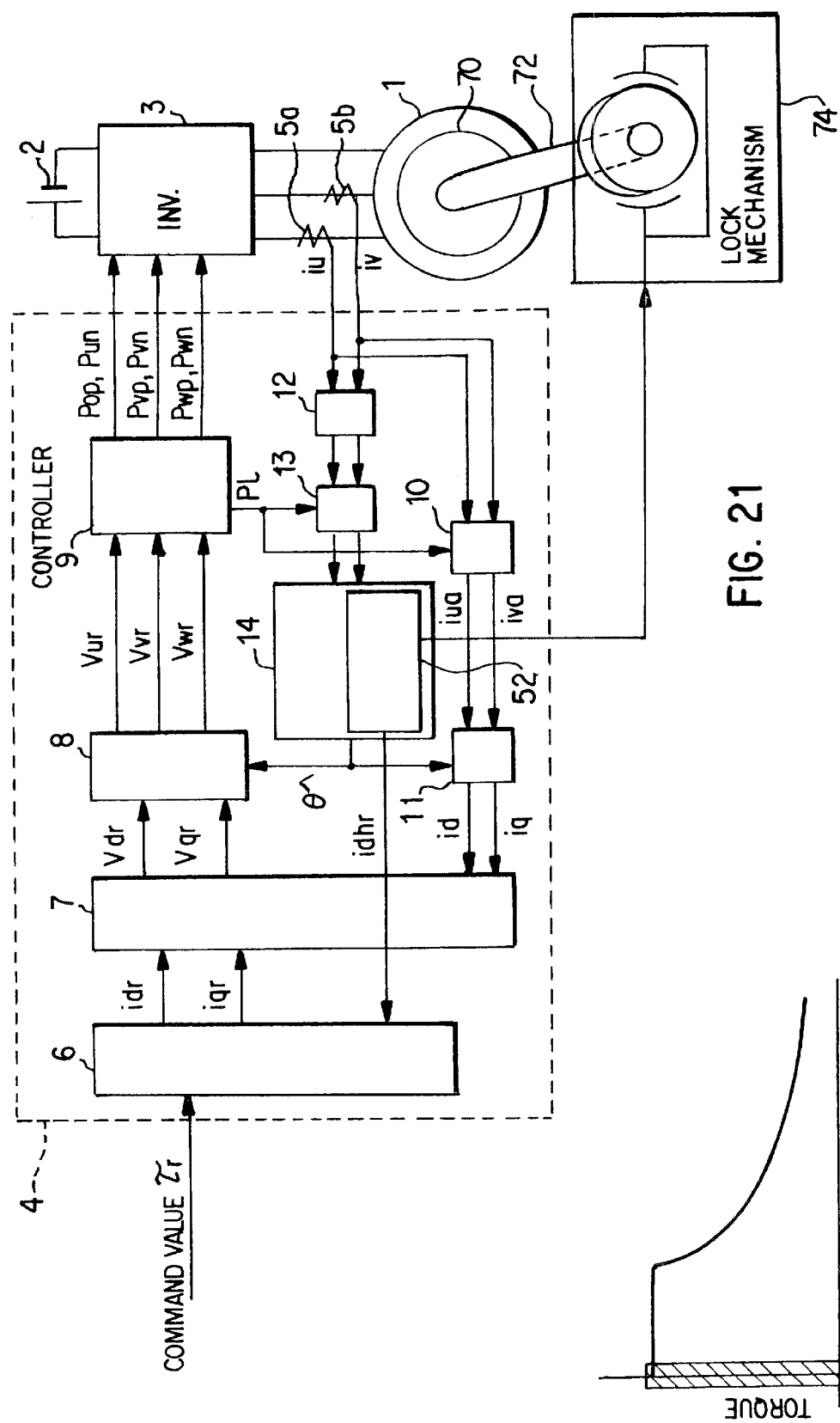
FIG. 21 is a diagram of a synchronous motor control system showing another embodiment according to the present invention.
FIG. 22 is a diagram showing a possible region in which detection accuracy of the magnetic pole position reduces.

However, in the following operating region which will be explained hereinbelow, the position estimation accuracy only with the present detection method will possibly be reduced. FIG. 22 shows the above referred to operation range. Under the rotation speed of zero, namely when the rotation of the motor 1 is stopped, the torque of the motor is also zero. The motor rotation stoppage state, for example, under the condition when the motor 1 is going to start, no motor current yet flows. Therefore, the current variation amount when short circuited can not be detected even if intended to perform the PWM control. Further, even after the motor is started, when the rotation speed thereof is low and the torque thereof is small, the current value is also small, therefore, the above indicated measurement is also difficult. Resultantly, the detection accuracy of the magnetic pole position is also reduced. Still further, even in a region near the zero speed where a current flows, the direction of magnetic fluxes can be detected by making use of the current variation amount at the time of short circuited state, it is impossible to discriminate its polarity, in that whether the detected direction is in N pole or S pole because of extremely small effect of the induced voltage.

For the above mentioned operating region, for example, below 800 rpm a detecting unit 52 is provided according to the present embodiment so as to enhance the detection accuracy of the magnetic pole position. The structure and operation of the detecting unit 52 are explained with reference to FIG. 23. The detecting unit 52 primarily includes a signal generating unit 54 which generates signals used for estimation of the magnetic pole position and a polarity discrimination unit 56.

The signal generating unit 54 which generates the signals used for estimation of the magnetic pole position generates a current command value idhr used for position detection so as to cause a current enough to permit the detection of a current variation amount when the motor is short circuited to provide the same to the current command value generating unit 6, when detecting the magnetic pole position in the region where no current is flowing or in the region where the current value is small, for example, during the starting-up of the motor 1.

Figure 24:
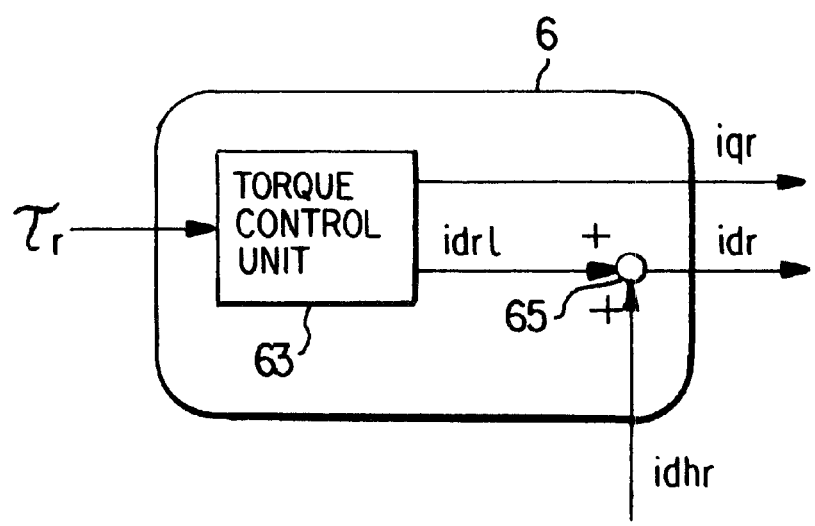
FIG. 24 is a diagram showing a structure of a current command value generating unit 6 in FIG. 21.

The structure of the current command value generating unit 6 is shown in FIG. 24. In the embodiments as explained in connection with FIGS. 1 through 20 as well as in FIG. 21 embodiment, the torque command Tr is inputted into the current command value generating unit 6 from an upper hierarchy control unit with respect to the controller 4. The current command value generating unit 6 includes a torque control unit 63 and calculates current commands idr and iqr for d-q axes so that the synchronous motor 1 generates a torque according to the command. Usually, the torque command and the motor speed (in FIG. 24 illustration thereof is omitted) are used as its inputs, and proper idr and iqr which achieve the maximum efficiency at the moment concerned are calculated through such as a map retrieval thereof. The usual operating state as referred to above implies, for example, a state where the motor 1 is rotating at a higher speed than the predetermined rotating speed of 800 rpm.

As has been explained in the above, when the synchronous motor 1 is rotating at a low speed less than 800 rpm such as during starting-up of the synchronous motor 1, the current command idhr for detecting the magnetic pole position is outputted from the signal generating unit 54 and is applied to an adder 65. The current command idhr is added to a current command idr1 in d axis direction at the adder 65, and the added result is applied as d axis current command idr from the current command value generating unit 6 to the current control unit 7. In the present embodiment the current command idhr for detecting the magnetic pole position is applied to the current command in d axis direction. This is to prevent generation of useless torque due to application of idhr. Namely, if a current in q axis direction is zero, no torque is, in principle, generated even if a current in d axis direction is applied. Of course, the magnetic pole position can be detected, even when a current command iqhr in q axis direction or current commands idhr and iqhr in d and q axes directions are applied. Accordingly, when a torque generation is acceptable for the total control operation a current command in q axis direction can be added for the detection of the magnetic pole position. Further, the current command can be applied only for a short period corresponding to the measuring time.

Further, the current command idhr to be applied and used for the position estimation can be either AC signals or DC signals. When AC signals are used for the current command idhr, an averaged torque assumes zero which is to be generated due to deviation between a detected position value which is caused in the initial period of the estimating operation and the magnetic pole position of the synchronous motor. Thereby, an influence of torque variation is suppressed.

As has been explained hitherto, under the condition that the speed of the synchronous motor is zero and no current flows therethrough, for example, when starting rotation of the motor from its stand still condition, the position detection making use of the current variation amount when the motor is short circuited can be used by applying the signals used for position estimation. However, the detected position indicates direction of fluxes, it is unclear whether the direction is in N pole direction or in S pole direction. This is because that the angular velocity ω of the motor is zero and no influence of an induced voltage is affected.

Figure 23:
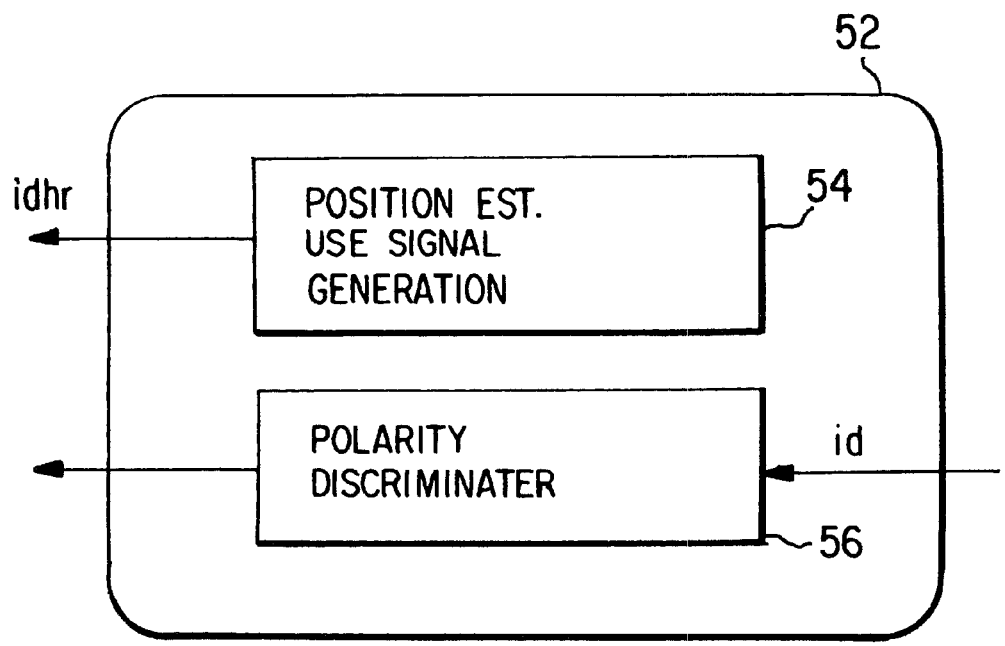
FIG. 23 is a diagram showing a structure of a calculating unit 52 in FIG. 21.

In order to resolve the above task, FIG. 23 embodiment is provided with the polarity discriminating unit 56 for discriminating whether the calculated position is N pole or S pole, namely discriminating polarity of the magnetic pole. Although the discrimination methods used for the polarity discriminating unit 56 are not limited, a method which uses the magnetic saturation characteristic of a synchronous motor is effective. Hereinbelow, as an example of polarity discriminating methods the method of using the magnetic saturation characteristic will be explained.

Figure 25:
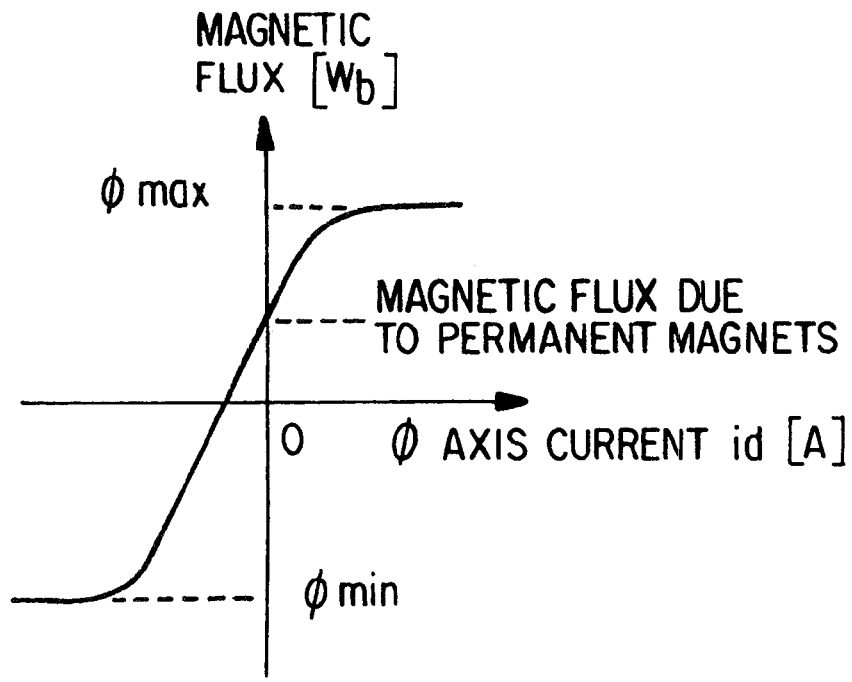
FIG. 25 is a diagram showing a magnetic characteristic of a synchronous motor.
Figure 26:
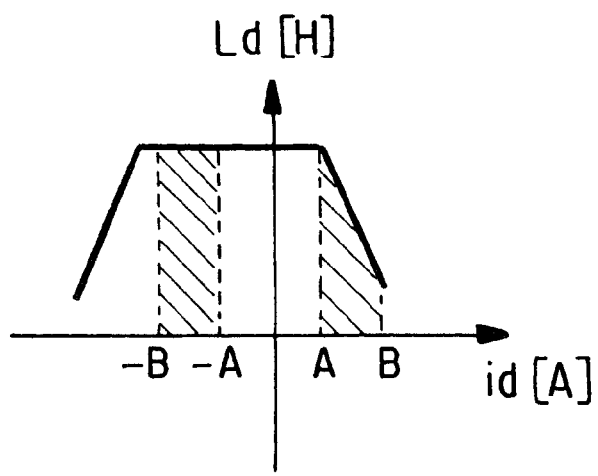
FIG. 26 is a diagram showing a d axis characteristic of a synchronous motor.

With regard to the magnetic characteristic of a synchronous motor, since the rotor thereof includes permanent magnets, there exist magnetic fluxes even when d axis current id representing the magnetic flux axis is zero as illustrated in FIG. 25. Due to this magnetic characteristic, the d axis inductance Ld shows the characteristic as illustrated in FIG. 26. From FIG. 26 it is understood that there exist a plurality of regions having different magnitudes depending on differences of positive or negative of d axis current id, in that regions as indicated by hatchings in FIG. 26. Accordingly, if an AC signal having an biasing component which causes d axis current id within the hatched regions as illustrated in FIG. 26, the response in the current control system varies depending on the magnitude of the inductance Ld and the polarity difference between N pole and S pole reflects in the amplitude difference of the motor current, thereby the polarity discrimination of the magnetic pole is enabled through the measurement of the magnitude of the motor current amplitude, which is an example of the polarity discrimination methods.

Now, the processing sequence of the above polarity discriminating method is explained with reference to FIG. 23. At first, from the signal generating unit 54 which generates signals for detecting the magnetic pole position an AC signal having a DC biasing component is applied to the d axis current command. Subsequently, a detected d axis current id is inputted into the polarity discriminating unit 56 in which an amplitude of the AC component in the d axis current id is measured and the polarity of the current position setting value θΛ is discriminated.

If the discrimination result is as N pole, the position setting value θΛ for the control system is used as it is for the control. On the other hand, if the discrimination result is as S pole, the position setting value θΛ is corrected to N pole by adding or subtracting 180° to and from the position setting value θΛ. In this polarity discriminating method a current is flowed in d axis direction to the extent that magnetic saturation is caused in the synchronous motor, therefore, if a slight error is caused in the position setting value θΛ, a torque in a predetermined direction is induced in the motor. Accordingly, the magnetic pole position detecting operation during start-up period is performed under a condition that the rotation of the rotary shaft is prevented with a provision of a lock mechanism which temporarily and mechanically prevents rotation of the rotary shaft and the rotor of the synchronous motor possible caused by the induced torque. For example, as illustrated in FIG. 21, a lock mechanism 74 is provided which prevents rotation of a rotor 70 or a rotary shaft 72 of the motor 1. The lock mechanism 74 corresponds to a usual brake mechanism and temporarily prevents their rotation in response to a signal from the detector unit 52. Further, the lock mechanism 74 is activated during the rotation start-up period, and since the torque at that period is small, a lock mechanism with a simple structure can achieve the object concerned. The rotation preventing operation by the lock mechanism 74 is released by a signal from the detector unit 52 after completing the detection of the magnetic pole position and the polarity thereof for starting rotation.

Figure 27:
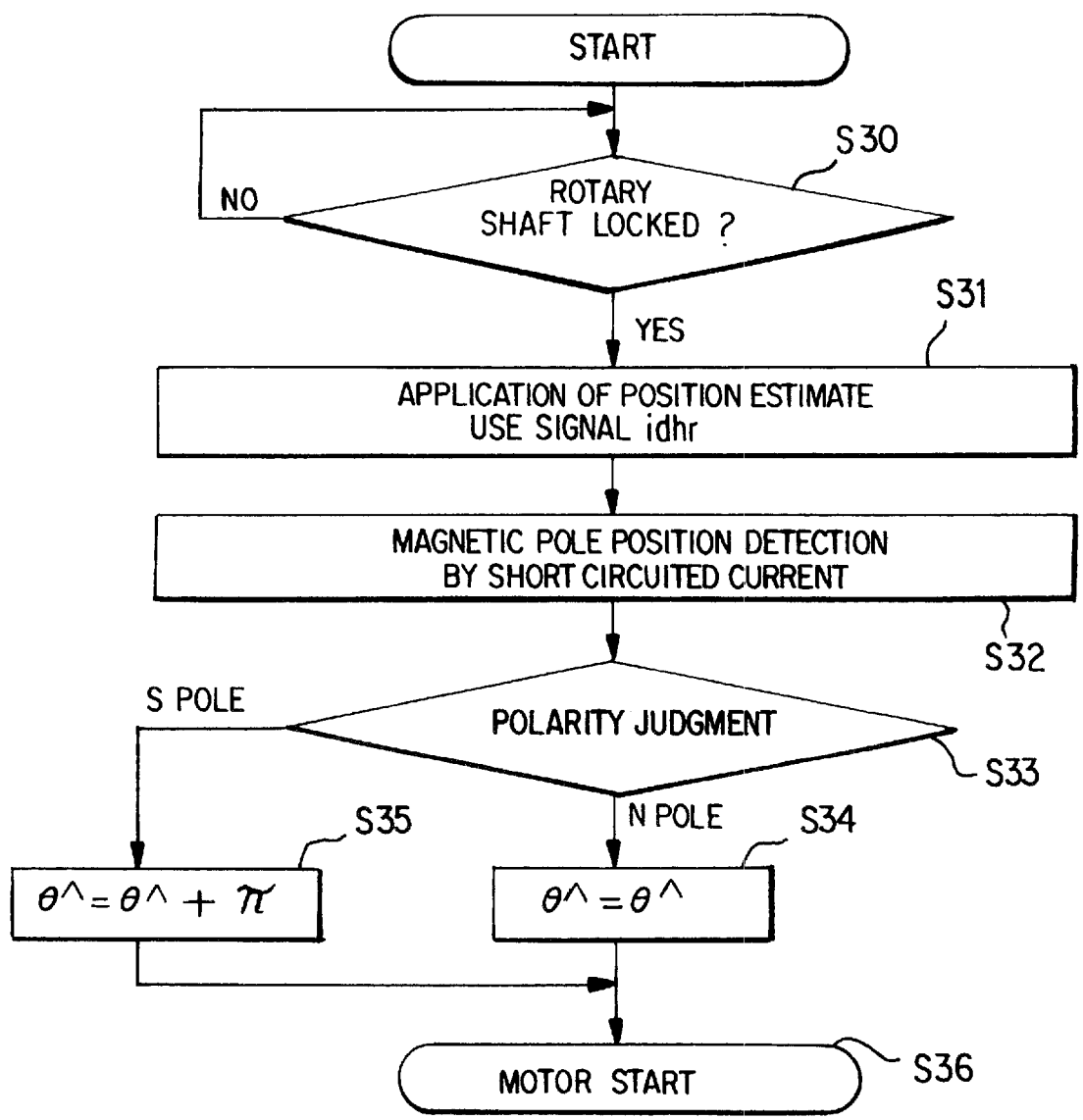
FIG. 27 is a flow chart showing a processing sequence for detecting a magnetic pole position during the time when a synchronous motor is started.

Now, the processing sequence of detecting the magnetic pole position at zero motor speed during the motor start-up period which is performed by the detector unit 52 is explained with reference to FIG. 27 flow chart. In FIG. 27, letter S implies a step, namely a processing sequence. At first, in step S 30, it is judged whether the rotation of the motor rotary shaft is prevented by the lock mechanism. If the rotation of the rotary shaft is prevented, a signal idhr used for detecting the magnetic pole position is outputted from the polarity discriminating unit 56 to apply the same to the adder 65 for performing adding calculation to the current command idr1 from the current command value generating unit 6 in step S 31.

The above explanation relates to the instance in which the lock mechanism for preventing motor rotation during motor start-up period, namely rotation start-up period is provided. If no such lock mechanism is provided, the step S 30 is omitted.

When the lock mechanism is provided and is not activated, a command for activating the lock mechanism is issued in step S 30 or the actuation thereof is waited until a command from another control unit is issued. When the lock mechanism is activated, the process moves to step S 31.

In step S 32, a short circuited current which is induced during a PWM control is detected and a detection value θΛ is calculated through the magnetic pole position detecting method using the short circuited current variation amount as has been explained above. Further, in step S 33, it is judged whether the detected value θΛ obtained in step S 32 and representing the magnetic pole position is in N pole direction or S pole direction. When the judgement result reveals as N pole, the detected value θΛ is determined corresponding to the current magnetic pole position in step S 34. Contrary thereto, when it is judged as S pole in step S 33, the detected value θΛ is corrected by adding or subtracting 180° so as to determine the current magnetic pole position in step S 35. Thereafter, the motor drive control is initiated in step S 36 by making use of the obtained detection value of the magnetic pole position.

The above is the processing sequence during the motor start-up period which makes use of the magnetic pole position detecting method at zero motor rotation speed. If the detection accuracy of the magnetic pole position only with the magnetic pole position detecting method using the short circuited current variation of the motor is insufficient, a highly accurate magnetic pole position detection can be performed through the above explained processings. In the present embodiment, although the locking of the rotary shaft of the motor is determined as the condition for initiating the detecting operation of the magnetic pole position, it is possible to detect the magnetic pole position even if the rotary shaft is not locked as has been explained previously.

Now, the operation of the calculating unit 52 is explained under the condition that the rotating speed of the motor is zero but the motor current is flowing therethrough. This operating environment corresponds to the instance that the load torque at the time of rotation stoppage, namely the motor torque which is necessary to drive a device to be driven by the motor is larger than that now being generated by the motor and further the magnetic pole position setting value in the controller is erased or become inaccurate due to influences such as noises. In such instance, since the motor current is flowing, the detection of the magnetic pole position by making use of the motor short circuited current variation as has been explained above is possible. However, since the motor speed is zero, it is necessary to perform the polarity discrimination. In this instance, since the motor rotary shaft is not locked and the motor is being driven, the following polarity discrimination method is more preferable than the polarity discrimination method which makes use of the magnetic saturation characteristic as has been explained above.

Figure 28:
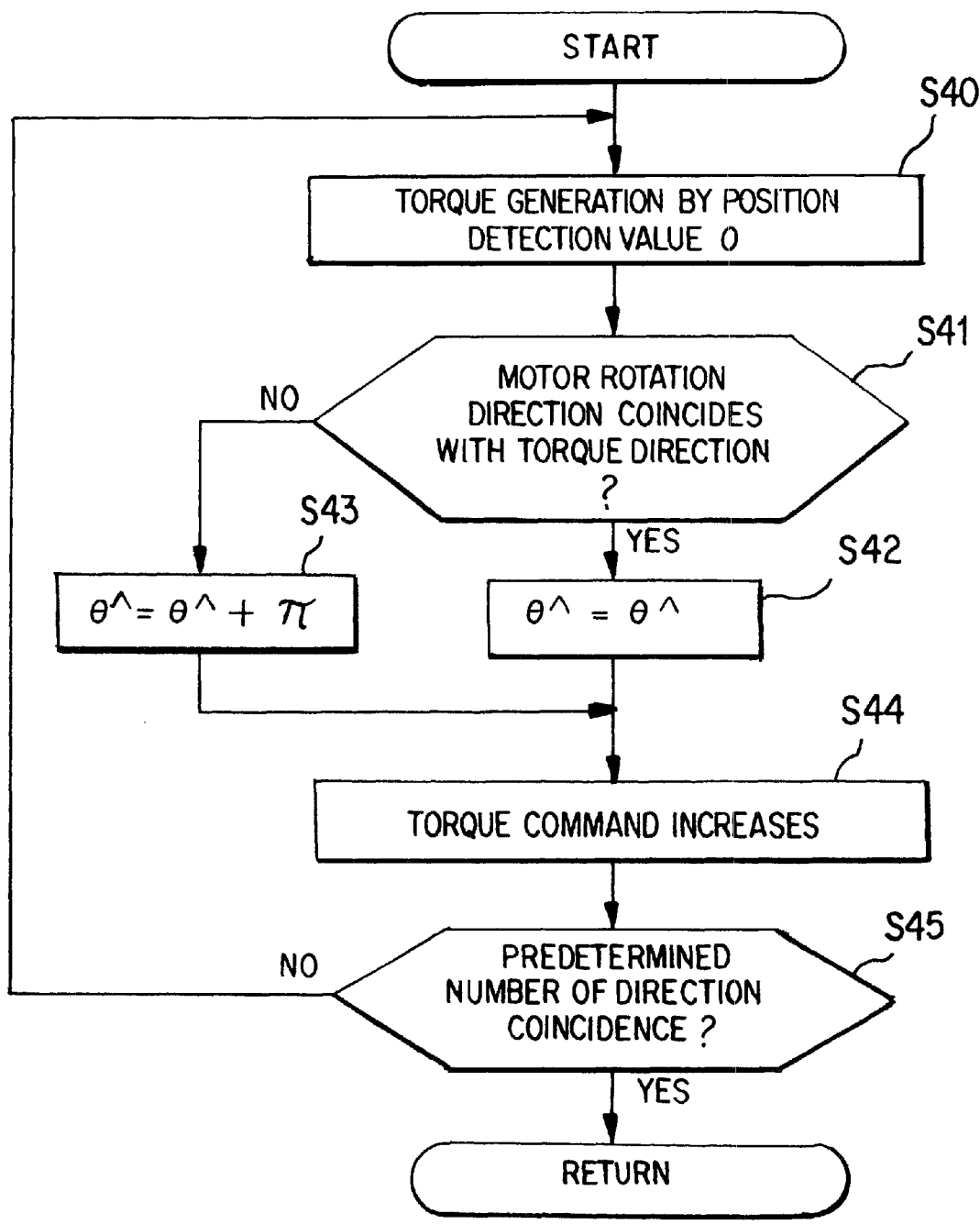
FIG. 28 is a flow chart showing a processing sequence for discriminating polarity of magnetic pole based on torque generating direction and rotating direction of a rotor shaft of a synchronous motor.

The above referred to polarity discrimination method is one in which the polarity is discriminated from the motor torque generating direction and the motor shaft rotating direction. The operation, namely the processing contents of the present discrimination method will be explained with reference to FIG. 28 flow chart. At first, in step S 40 a predetermined desired torque is generated by using the detection value θΛ which is obtained based on the motor short circuited current variation as the setting value for the magnetic pole position. Thereafter, in step S 41 the motor shaft rotating direction and the generated torque direction are compared, and if the both directions coincide, the setting value for the magnetic pole position is determined as the current magnetic pole position in step S 42. On the other hand, if the motor shaft rotating direction and the generated torque direction do not coincide each other, it is judged that the polarity is opposite in step S 41, and in step S 43 the setting value is corrected by 180° to determine the current magnetic pole position. Further, in step S 44 the torque command is increased. The above operation is repeated up to a predetermined number of times and if the number of coincidence of the motor shaft rotating direction and the generated torque direction exceeds successively the predetermined number of times, the polarity discrimination is ended. The above is the processing sequence of the polarity discrimination method of the setting value for the magnetic pole position based on the torque generating direction and the motor rotation shaft rotating direction. In the present method, an application of specific signals used for polarity discrimination is unnecessary.

In the above, the magnetic pole position detecting method when motor speed is zero is explained which incorporates the magnetic pole position detecting method making use of the motor short circuited current variation amount. The present method can be applied when the motor speed is extremely low so that an induced voltage thereby is also extremely low. For example, the present method is effective for a rotating speed less than 800 rpm.

Further, the present method can be applied as it is to a driving device for an electric vehicle including an electric motor vehicle and a hybrid car having both a motor and an engine. In the driving device for an electric motor vehicle and a hybrid car, if the detection through application of a signal used for position detection or the polarity discrimination making use of the magnetic saturation characteristic is performed under the condition that a brake therefor is activated or the operation range is set at the parking range, vibration or displacement of the vehicle due to unnecessary torque generation is avoided.

According to the above embodiments the magnetic pole position detection is enabled over the entire operating range of a synchronous motor without being affected by the applied voltage states while performing a usual PWM control with a low cost controller.

Still further, according to the embodiment as explained in connection with FIGS. 21 through 28, an accurate control can be performed from the motor stand still period.

Still further, according to the embodiments as explained in connection with FIGS. 1 through 28, since the magnetic pole position of a synchronous motor is determined based on the motor current variation amount or the variation direction thereof, the magnetic pole position detection can be realized without providing a position detector while performing a usual PWM control.

Moreover, when a magnetic pole detector is provided, through the comparison between the magnetic pole position detected by the magnetic pole detector and the magnetic pole position determined by the motor current an abnormality of the magnetic pole position detector can be sensed while performing a usual PWM control.

According to the present invention, a low cost synchronous motor driving system with an excellent control performance can be provided.

Further, according to the present invention, in case when a usual mechanical magnetic pole position sensor is used, an abnormality of such sensor is detected, and a highly reliable synchronous motor driving system can be provided.

What is claimed is:

1. A device for controlling a synchronous motor, comprising:
   an inverter which drives said synchronous motor; and
   a controller which detects a magnetic pole position of said synchronous motor based on a variation of a motor current when said synchronous motor is put in a short circuited state, and outputs a control signal to control said synchronous motor based on the detected magnetic pole position; wherein
   said inverter controls said synchronous motor based on the control signal; and
   detection of the magnetic pole position by said controller is effected under a condition when said synchronous motor is controlled by said inverter.

2. The device according to claim 1, wherein, in the short circuited state of said synchronous motor, all phases thereof are short circuited.

3. The device according to claim 1, wherein said controller detects a variation amount or a variation direction of the motor at a moment when said synchronous motor is in a two phase short circuited state, which is generated when said inverter controls said synchronous motor through a PWM control.

4. The device according to claim 1, wherein said controller detects a variation amount or the variation direction of the motor current at the moment when said synchronous motor is placed in a three phase short circuited state, which is generated when said inverter controls said synchronous motor through a PWM control.

5. The device according to claim 1, wherein said controller obtains the variation amount or the variation direction of the motor current under a short circuited state representing the same when said synchronous motor is placed in a three phase short circuited state, from a variation amount or variation direction of the motor currents at the time of a plurality of different two phase short circuited states of said synchronous motor.

6. The device according to claim 1, wherein said controller comprises prolonging means which prolongs the three phase short circuited state.

7. The device according to claim 6, wherein said prolonging means prolongs the three phase short circuited state through a two phase switching operation.

8. A device for controlling a synchronous motor control device comprising:
   an inverter which drives said synchronous motor; and
   a controller which detects a magnetic pole position of said synchronous motor based on a variation direction of a motor current when said synchronous motor is put in a short circuited state, and generates a control signal to control said synchronous motor based on the detected magnetic pole position; wherein
   said inverter controls said synchronous motor based on the control signal; and
   detection of the magnetic pole position by said controller is effected under a condition when said synchronous motor is controlled by said inverter.

9. The device according to claim 8, wherein, in the short circuited state of said synchronous motor, all phases thereof are short circuited.

10. The device according to claim 8, wherein said controller detects a variation amount or the variation direction of the motor at the moment when said synchronous motor is placed in a two phase short circuited state, which is generated when said inverter controls said synchronous motor through a PWM control.

11. The device according to claim 8, wherein said controller detects a variation amount or the variation direction of the motor at the moment when said synchronous motor is placed in a three phase short circuited state, which is generated when said inverter controls said synchronous motor through a PIRM control.

12. The device according to claim 8, wherein said controller obtains the variation amount or the variation direction of the motor current under a short circuited state, representing the same when said synchronous motor is placed in a three phase short circuited state from a variation amount or variation direction of the motor currents at the time of a plurality of direction two phase short circuited states, of said synchronous motor.

13. The device according to claim 8, wherein said controller comprises prolonging means which prolongs the three phases short circuited state.

14. The device according to claim 13, wherein said prolonging means prolongs the three phase short circuited state through a two phase switching operation.

15. A device for controlling a synchronous motor control device comprising:
an inverter which drives said synchronous motor and a controller which generates a control signal, wherein said inverter drives said synchronous motor based on the control signal generated by said controller; and
said controller which detects a variation direction of a motor current when said synchronous motor is in a short circuited state under control by said inverter, sets a d-q axes coordinate system while assuming the magnetic flux direction of a rotor of said synchronous motor as d axis and an axis orthogonal to the d axis as q axis, detects a d axis current and a q axis current on the d-q axes coordinate system, calculates the magnetic pole position of said synchronous motor based on the detected variation direction of the motor current, the detected d axis current and the detected q axis current and generates the control signal depending on the calculated magnetic pole position.

16. The device according to claim 15, wherein, in the short circuited state of said synchronous motor, all three phases thereof are short circuited.

17. The device according to claim 15, wherein said controller detects a variation amount or the variation direction of the motor at the moment when said synchronous motor is placed in a two phase short circuited state, which is generated when said inverter controls said synchronous motor through a PWM control.

18. The device according to claim 15, wherein said controller obtains the variation or the variation direction of the motor current under a short circuited state, representing the same when said synchronous motor is placed in a three phase short circuited state from a variation amount or variation direction of the motor currents at the time of a plurality of direction two phase short circuited states of said synchronous motor.

19. The device according to claim 15, wherein said controller comprises prolonging means which prolongs the three phase short circuited state.

20. The device according to claim 19, wherein said prolonging means prolongs the three phase short circuited state through a two phase switching operation.

21. A device for controlling a synchronous motor comprising:
a magnetic pole position detector which detects a magnetic pole position of said synchronous motor;
a controller which controls said synchronous motor depending on the magnetic pole position detected by said magnetic pole position detector; and
an inverter which drives said synchronous motor based on a signal from said controller,
wherein said controller determines the magnetic pole position of said synchronous motor based on a variation amount or a variation direction of a motor current when said synchronous motor is placed in a short circuited state under control by said inverter, and detects an abnormality in said magnetic pole position detector or the controller through comparison of the magnetic pole position detected by the magnetic pole position detector with the magnetic pole position obtained from the variation amount or the variation direction of the motor current.

22. The device according to claim 21, wherein when an abnormality in said magnetic pole position detector is detected, said controller controls said synchronous motor based on the magnetic pole position obtained from the variation amount or the variation direction of the motor current.

23. An electric motor vehicle control device comprising:
a synchronous motor which drives the electric motor vehicle;
a magnetic pole position detector which detects a magnetic pole position of said synchronous motor;
a controller which controls said synchronous motor depending on the magnetic pole position detected by said magnetic pole position detector; and
an inverter which drives said synchronous motor based on a signal from said controller,
wherein said controller determines the magnetic pole position of said synchronous motor based on a variation amount or a variation direction of a motor current when said synchronous motor is placed in a short circuited state under control by said inverter, and detects an abnormality in said magnetic pole position detector or the controller through comparison of the magnetic pole position detected by the magnetic pole position detector with the magnetic pole position obtained from the variation amount or the variation direction of the motor current.

24. An electric motor vehicle control device according to claim 23, wherein when an abnormality in said magnetic pole position detector is detected, said controller controls said synchronous motor based on the magnetic pole position obtained from the variation or the variation direction of the motor current.

25. An electric motor vehicle control device according to claim 23, wherein when said controller detects an abnormality, said controller stops the electric motor vehicle.

26. A synchronous motor comprising:
a controller; and
an inverter which drives said synchronous motor based on an output from said controller;
wherein said controller includes a first detector unit which detects a magnetic pole position of said synchronous motor based on a variation amount or a variation direction of a motor current when said synchronous motor is in a short circuited state under control by said inverter, and a control unit which generates an output based on the detected magnetic pole position, and further includes a second detector unit which detects a magnetic pole position at the time when a rotating speed of said synchronous motor is in a predetermined low range including a rotation stoppage state, wherein said controller controls the synchronous motor based on an output from said second detector unit when a rotating speed of said synchronous motor is in a predetermined low range including a rotation stoppage state and controls based on an output from said direct detector unit when a rotating speed of said synchronous motor is in a range larger than the predetermined low range.

27. The device according to claim 26, wherein said second detector unit includes a signal generating means which generates a signal for detecting a current used for calculating the magnetic pole position and a polarity discriminating unit which discriminates whether the calculated magnetic pole position is N pole direction or S pole direction.

28. The device according to claim 27, wherein said controller sends out PWM pulses to said inverter so that a current flows through said synchronous motor based on the output from said signal generating means, calculated a magnetic pole position by detecting the current of the synchronous motor based on the output from said signal generating means and controls the synchronous motor.

29. The device according to claim 27, further comprising a current control unit which controls a torque of said synchronous motor, wherein said polarity discriminating unit applies to said current control unit a current command for discriminating polarity in d axis direction and discriminating polarity of the magnetic pole based on differences in response characteristics of said synchronous motor.

30. The device according to claim 27, wherein said polarity discriminating unit discriminates polarity of the magnetic pole based on the torque of said synchronous motor which is generated depending on calculated magnetic pole position and rotating direction of a rotor shaft of said synchronous motor.

31. The device according to claim 26, further comprising a mechanism which prevents rotation of said synchronous motor, wherein when the rotation of said synchronous motor is prevented by said mechanism, a current based on an output current from said second detector unit is supplied to said synchronous motor.

32. An electric motor vehicle control device having a synchronous motor, comprising:
   a controller; and
   an inverter which drives said synchronous motor based on an output from said controller;
   wherein said controller includes a first detector unit which detects a magnetic pole position of said synchronous motor based on a variation amount or a variation direction of a motor current when said synchronous motor is in a short circuited state under control by said inverter, and a control unit which generates an output based on the detected magnetic pole position, and further includes a second detector unit which detects a magnetic pole position at the time when a rotating speed of said synchronous motor is in a predetermined low range including a rotation stoppage state, wherein said controller controls the synchronous motor based on an output from said second detector unit when a rotating speed of said synchronous motor is in a predetermined low range including a rotation stoppage state and controls based on an output from said first detector unit when a rotating speed of said synchronous motor is in a range larger than the predetermined low range.

33. The electric motor vehicle control device according to claim 32, wherein said second detector unit includes a signal generating means which generates a signal for detecting a current used for calculating the magnetic pole position and a polarity discriminating unit which discriminates whether the calculated magnetic pole position is N pole direction or S pole direction.

34. The electric motor vehicle control device according to claim 33, wherein said controller sends out PWM pulses to said inverter so that a current flows through said synchronous motor based on the output from said signal generating means, calculates a magnetic pole position by detecting the current of the synchronous motor based on the output from said signal generating means and controls the synchronous motor.

35. The electric motor vehicle control device according to claim 33, further comprising a current control unit which controls a torque of said synchronous motor, wherein said polarity discriminating unit applies to said current control unit a current command for discriminating polarity in d axis direction and discriminates polarity of the magnetic pole based on differences in response characteristics of said synchronous motor.

36. The electric motor vehicle control device according to claim 33, wherein said polarity discriminating unit discriminates polarity of the magnetic pole based on the torque of said synchronous motor which is generated depending on calculated magnetic pole position and rotating direction of a rotor shaft of said synchronous motor.

37. An electric motor vehicle control device according to claim 32, wherein the current supply to said synchronous motor based on the output from said second detector unit is started under a state when rotation of a driving wheel of said electric motor vehicle is prevented including a state wherein a brake for said electric motor vehicle is activated.

38. An electric motor vehicle control device according to claim 32, wherein the current supply to said synchronous motor based on the output from said second detector unit is started under a state when rotation of a driving wheel of said electric motor vehicle is prevented including a state wherein a brake for said electric motor vehicle is activated.

39. An electric motor vehicle control device according to claim 34, wherein the current supply to said synchronous motor based on the output from said second detector unit is started under a state when rotation of a driving wheel of said electric motor vehicle is prevented including a state wherein a brake for said electric motor vehicle is activated.

40. An electric motor vehicle control device according to claim 35, wherein the current supply to said synchronous motor based on the output from said second detector unit is started under a state when rotation of a driving wheel of said electric motor vehicle is prevented including a state wherein a brake for said electric motor vehicle is activated.

41. An electric motor vehicle control device according to claim 36, wherein the current supply to said synchronous motor based on the output from said second detector unit is started under a state when rotation of a driving wheel of said electric motor vehicle is prevented including a state wherein a brake for said electric motor vehicle is activated.

42. An electric motor vehicle control device according to claim 32, wherein the current supply to said synchronous motor based on the output from said second detector unit is started under a state when an operation range of said electric motor vehicle is in parking range.

43. An electric motor vehicle control device according to claim 33, wherein the current supply to said synchronous motor based on the output from said second detector unit is started under a state when an operation range of said electric motor vehicle is in parking range.

44. An electric motor vehicle control device according to claim 34, wherein the current supply to said synchronous motor based on the output from said second detector unit is started under a state when an operation range of said electric motor vehicle is in parking range.

45. An electric motor vehicle control device according to claim 35, wherein the current supply to said synchronous motor based on the output from said second detector unit is started under a state when an operation range of said electric motor vehicle is in parking range.

46. An electric motor vehicle control device according to claim 36, wherein the current supply to said synchronous motor based on the output from said second detector unit is started under a state when an operation range of said electric motor vehicle is in parking range.

47. The electric motor vehicle control device having a synchronous motor, comprising:
   a controller; and
   an inverter which drives said synchronous motor based on an output from said controller;

wherein said controller includes a first detector unit which detects a magnetic pole position of said synchronous motor based on a variation amount or a variation direction of a motor current when said synchronous motor is in a short circuited state under control by said inverter, and a control unit which generates an output based on the detected magnetic pole position, and further includes a second detector unit which detects a magnetic pole position at the time when a rotating speed of said synchronous motor is in a predetermined low range including a rotation stoppage state, wherein said controller controls the synchronous motor based on an output from said second detector unit when a rotating speed of said synchronous motor is in a predetermined low range including a rotation stoppage state and controls based on an output from said first detector unit when a rotating speed of said synchronous motor is in a range larger than the predetermined low range; and further comprising a mechanism which prevents rotation of said synchronous motor, wherein when the rotation of said synchronous motor is prevented by said mechanism, a current based on an output current from said second detector unit is supplied to said synchronous motor.

48. An electric motor vehicle control device according to claim 47, wherein the current supply to said synchronous motor based on the output from said second detector unit is started under a state when rotation of a driving wheel of said electric motor vehicle is prevented including a state wherein a brake for said electric motor vehicle is activated.

49. An electric motor vehicle control device according to claim 47, wherein the current supply to said synchronous motor based on the output from said second detector unit is started under a state when an operation range of said electric motor vehicle is in parking range.

* * * * *